(12) United States Patent
Srivastav et al.

(10) Patent No.: US 10,558,373 B1
(45) Date of Patent: Feb. 11, 2020

(54) SCALABLE INDEX STORE

(71) Applicant: EMC IP Holding Company LLC, Hopkinton, MA (US)

(72) Inventors: Shashwat Srivastav, Seattle, WA (US); Vishrut Shah, Redmond, WA (US); Sriram Sankaran, Bellevue, WA (US); Jun Luo, Bellevue, WA (US); Chen Wang, Shanghai (CN); Huapeng Yuan, Seattle, WA (US); Subba Gaddamadugu, Worcester, MA (US); Qi Zhang, Redmond, WA (US); Jie Song, Shanghai (CN); Andrew Robertson, Washington, DC (US); Peter Musial, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/978,570

(22) Filed: Dec. 22, 2015

Related U.S. Application Data

(63) Continuation of application No. 13/886,892, filed on May 3, 2013, now Pat. No. 9,223,517.

(51) Int. Cl.
  *G06F 12/00* (2006.01)
  *G06F 17/30* (2006.01)
  *G06F 3/06* (2006.01)

(52) U.S. Cl.
  CPC ............ *G06F 3/0619* (2013.01); *G06F 3/065* (2013.01); *G06F 3/0665* (2013.01); *G06F 3/0689* (2013.01)

(58) Field of Classification Search
  CPC .......................... G06F 3/0689; G06F 11/1076
  USPC ........................................................ 711/114
  See application file for complete search history.

(56) References Cited

U.S. PATENT DOCUMENTS

| | | | |
|---|---|---|---|
| 7,774,391 B1 * | 8/2010 | Le ..................... | G06F 17/30091 707/822 |
| 2012/0254111 A1 * | 10/2012 | Carmichael ....... | G06F 17/30094 707/627 |
| 2013/0103729 A1 * | 4/2013 | Cooney ............. | G06F 17/30126 707/831 |
| 2013/0262865 A1 * | 10/2013 | Irvine ................. | G06F 21/6218 713/165 |
| 2013/0290648 A1 * | 10/2013 | Shao ...................... | G06F 12/04 711/154 |

* cited by examiner

*Primary Examiner* — Adam M Queler
*Assistant Examiner* — Edmund Kwong
(74) *Attorney, Agent, or Firm* — Krishnendu Gupta; Deepika Bhayana; Dorothy Chiang

(57) ABSTRACT

A method, system, and computer program product for providing, via a provisioning engine, a scalable set of indexed key-value pairs enabled to store objects in a data storage environment; wherein the data representing the objects is enabled to be spread across arrays in the data storage environment; wherein additional arrays are enabled to be added to the data storage environment and included in the indexed key-value pairs; wherein the data stored across the arrays may be balanced.

19 Claims, 32 Drawing Sheets

Log writes in journal 505

Commit journal to B+ tree 510

Figure 21

Create Bucket 2110

SCALABLE INDEX STORE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

RELATED APPLICATIONS

This Application is related to U.S. patent application Ser. No. 13/630,455 entitled "SINGLE CONTROL PATH" filed on Sep. 28, 2012, Ser. No. 13/631,030 entitled "METHOD AND APPARATUS FOR FEDERATING A PLURALITY OF ONE BIG ARRAYS" filed on Sep. 28, 2012, Ser. No. 13/631,039 entitled "METHOD AND APPARATUS FOR AUTOMATED INFORMATION LIFECYCLE MANAGEMENT USING A FEDERATION OF ARRAYS" filed on Sep. 28, 2012, Ser. No. 13/631,055 entitled "METHOD AND APPARATUS FOR FEDERATED IDENTITY AND AUTHENTICATION SERVICES" filed on Sep. 28, 2012, Ser. No. 13/631,190 entitled "APPLICATION PROGRAMMING INTERFACE" filed on Sep. 28, 2012, Ser. No. 13/631,214 entitled "AUTOMATED POLICY BASED SCHEDULING AND PLACEMENT OF STORAGE RESOURCES" filed on Sep. 28, 2012, Ser. No. 13/631,246 entitled "DISTRIBUTED SYSTEM SOFTWARE INFRASTRUCTURE" filed on Sep. 28, 2012, and Ser. No. 13/886,786, entitled "DISTRIBUTED WORKFLOW MANAGER" filed on even date herewith, Ser. No. 13/886,789, entitled "PORT PROVISIONING SYSTEM" filed on even date herewith, Ser. No. 13/886,892, entitled "SCALABLE INDEX STORE" filed on even date herewith, Ser. No. 13/886,687, entitled "STORAGE PROVISIONING IN A DATA STORAGE ENVIRONMENT" filed on even date herewith, and Ser. No. 13/886,644, entitled "STORAGE PROVISIONING IN A DATA STORAGE ENVIRONMENT" filed on even date herewith, which are hereby incorporated herein by reference in their entirety.

BACKGROUND

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein. In a common implementation, a Storage Area Network (SAN) is used to connect computing devices with a large number of storage devices. Management and modeling programs may be used to manage these complex computing environments.

Two components having connectivity to one another, such as a host and a data storage system, may communicate using a communication connection. In one arrangement, the data storage system and the host may reside at the same physical site or location. Techniques exist for providing a remote mirror or copy of a device of the local data storage system so that a copy of data from one or more devices of the local data storage system may be stored on a second remote data storage system. Such remote copies of data may be desired so that, in the event of a disaster or other event causing the local data storage system to be unavailable, operations may continue using the remote mirror or copy.

In another arrangement, the host may communicate with a virtualized storage pool of one or more data storage systems. In this arrangement, the host may issue a command, for example, to write to a device of the virtualized storage pool. In some existing systems, processing may be performed by a front end component of a first data storage system of the pool to further forward or direct the command to another data storage system of the pool. Such processing may be performed when the receiving first data storage system does not include the device to which the command is directed. The first data storage system may direct the command to another data storage system of the pool which includes the device. The front end component may be a host adapter of the first receiving data storage system which receives commands from the host. In such arrangements, the front end component of the first data storage system may become a bottleneck in that the front end component processes commands directed to devices of the first data storage system and, additionally, performs processing for forwarding commands to other data storage systems of the pool as just described.

Often cloud computer may be performed with a data storage system. As it is generally known, "cloud computing" typically refers to the use of remotely hosted resources to provide services to customers over one or more networks such as the Internet. Resources made available to customers are typically virtualized and dynamically scalable. Cloud computing services may include any specific type of application. Some cloud computing services are, for example, provided to customers through client software such as a Web browser. The software and data used to support cloud computing services are located on remote servers owned by a cloud computing service provider. Customers consuming services offered through a cloud computing platform need not own the physical infrastructure hosting the actual service, and may accordingly avoid capital expenditure on hardware systems by paying only for the service resources they use, and/or a subscription fee. From a service provider's standpoint, the sharing of computing resources across multiple customers (aka "tenants") improves resource utilization. Use of the cloud computing service model has been growing due to the increasing availability of high bandwidth communication, making it possible to obtain response times from remotely hosted cloud-based services similar to those of services that are locally hosted.

Cloud computing infrastructures often use virtual machines to provide services to customers. A virtual machine is a completely software-based implementation of a computer system that executes programs like an actual computer system. One or more virtual machines may be used to provide a service to a given customer, with additional virtual machines being dynamically instantiated and/or allocated as customers are added and/or existing customer requirements change. Each virtual machine may represent all the components of a complete system to the program code running on it, including virtualized representations of processors, memory, networking, storage and/or BIOS (Basic Input/Output System). Virtual machines can accordingly run unmodified application processes and/or operating systems. Program code running on a given virtual machine executes using only virtual resources and abstractions dedicated to that virtual machine. As a result of such "encapsulation," a program running in one virtual machine is completely isolated from programs running on other virtual machines, even though the other virtual machines may be running on the same underlying hardware. In the context of cloud computing, customer-specific virtual machines can therefore be employed to provide secure and reliable separation of code and data used to deliver services to different customers.

SUMMARY

A method, system, and computer program product for providing, via a provisioning engine, a scalable set of indexed key-value pairs enabled to store objects in a data storage environment; wherein the data representing the objects is enabled to be spread across arrays in the data storage environment; wherein additional arrays are enabled to be added to the data storage environment and included in the indexed key-value pairs; wherein the data stored across the arrays may be balanced.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 21 is a simplified example of a method for creating a bucket in a data storage system, in accordance with an embodiment of the present disclosure;

FIG. 24 is a simplified illustration of requesting status of an object in a bucket in a data storage system, in accordance with an embodiment of the present disclosure;

DETAILED DESCRIPTION

Figure 1:
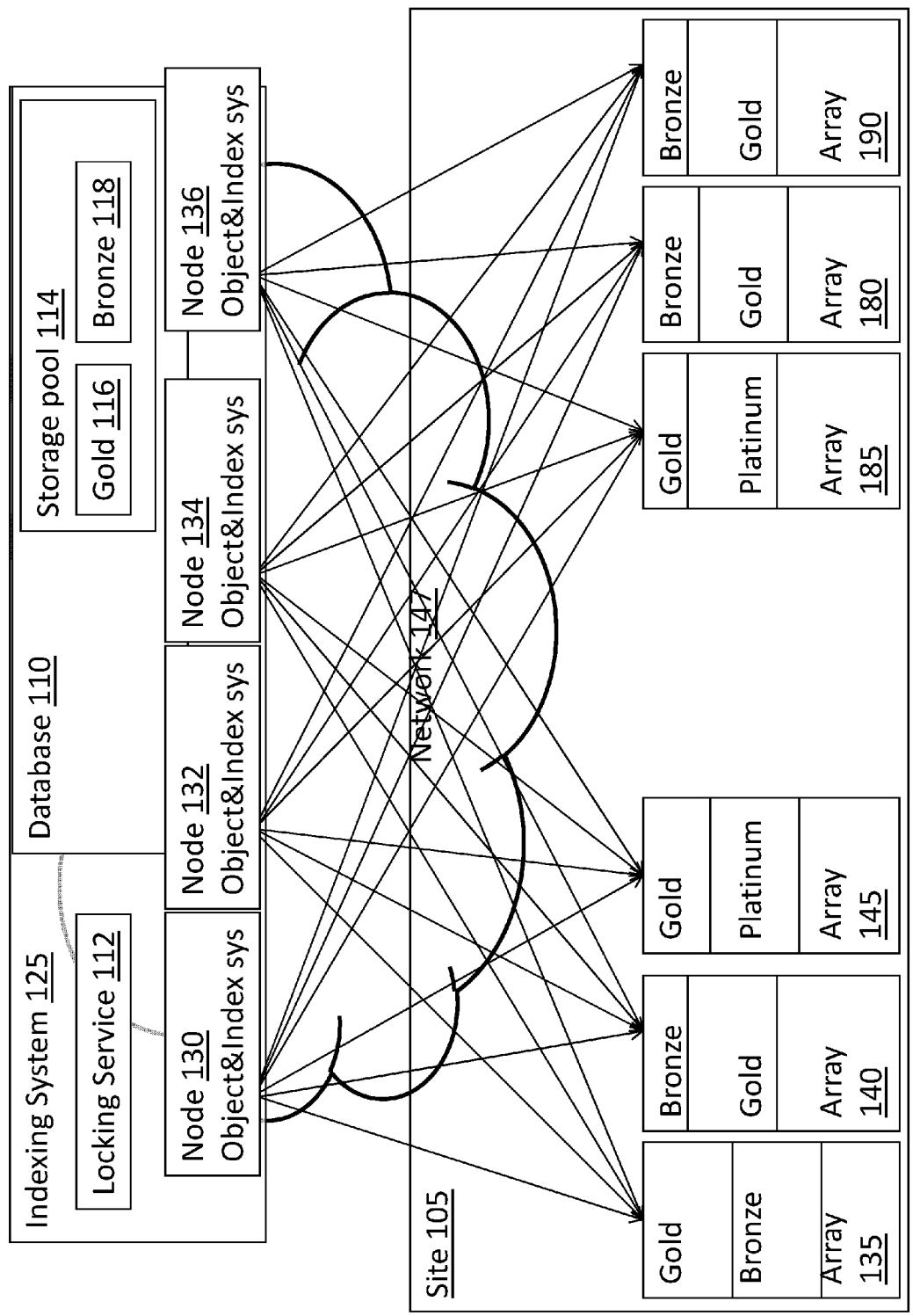
FIG. 1 is a simplified illustration of showing connectivity in a data storage environment, in accordance with an embodiment of the present disclosure.

Conventionally, object systems may not be scalable. Usually, and object system may not offer file access. Typically, a file system may not offer object access. Usually, a file system may not switch between file and object access.

In certain embodiments, the current disclosure may enable storage of a large table or index of key strings along with their corresponding value bytes on file shares across multiple devices.

In some embodiments, the current disclosure may enable an indexing service in a VM image that may be installed on a machine. In certain embodiments, a set of such nodes may form an indexing service layer. In an embodiment, a set of file shares may be created on NAS devices and registered with the ViPR indexing service for storage of data.

In certain embodiments, nodes may form a fault tolerant layer over NAS devices. In at least some embodiments, any number of nodes may be removed or added at any time without affecting the availability of an indexing system. In other embodiments, any number of ViPR nodes may be unavailable, but the transaction processing for any part of the data may continue to give a functioning node. In most embodiments, each node may be connected to a number of file shares. In certain embodiments, each note may be able to read and write data from any of file shares. In other embodiments, each node may also accept transaction for any part of the data for any file share.

In most embodiments, the current disclosure enables a horizontally scalable architecture. In certain embodiments, if file shares run out of space, new file shares can be created and registered with nodes. In certain embodiments, the indexing system may start placing new incoming writes in the new file shares. In further embodiments, any number of nodes may be dynamically added in the system to increase the transaction processing capacity of the system.

Virtual Storage Pool

In certain embodiments, a Virtual Storage Pool may be a definition of the characteristics of a file share device. In most embodiments, each file share registered with a data service may be associated with a Virtual Storage Pool.

In some embodiments, the desired Virtual Storage Pool characteristic for an index may be specified during its creation. In at least some embodiments, the data belonging to the index may be stored on the file shares that are associated with the Virtual Storage Pool. In other embodiments, if multiple file shares are associated with the Virtual Storage Pool, the data of the index may be spread across all the file shares. In certain embodiments, the index may be associated with a Virtual Storage Pool. In an embodiment, a Virtual Storage Pool may form logically disjoint sets in which data set is divided.

Partition

In some embodiments, a Virtual Storage Pool may be divided into one or more Partitions. In certain embodiments, partitioning may be done based on consistent hashing. In at least some embodiments, a hash number of a key may be found by deriving the SHA-256 value of the key string. In other embodiments, each partition may be identified by the divisor-remainder pair of the hash space. In a particular embodiment, if a partition has divisor identifier 4 and remainder identifier 1, then it may contain all the keys whose hash value when divided by 4 gives remainder 1. In most embodiments, the partition identifiers may be scoped within the Virtual Storage Pool so each of Virtual Storage Pool can have same partition identifiers. In certain embodiments, a partition may be responsible for storage of data associated with the keys that fall in its hash.

Partition Split/Merge

In most embodiments, the number of partitions in the system may change dynamically depending on the resources in the system. In certain embodiments, if ViPR nodes and NAS devices are added in the system then better load balancing may be achieved by automatically increasing the number of partitions in the system. In some embodiments, better load balancing may be achieved by a partition split process.

In at least some embodiments, the number of partitions may automatically be decreased when the resources become constrained. In one embodiment, partitions may be decreased when more file shares are creates on existing devices or when the number of ViPR nodes are removed from the system.

In alternative embodiments, a partition with identifiers divisor-4, remainder-1 may split into two partitions with identifiers divisor-8, remainder-1 and divisor-8, remainder-5. In other embodiments, two partitions with identifiers divisor-4, remainder-1 and divisor-4, remainder-3 may merge into one partition with identifier divisor-2, remainder-1.

Infrastructure Components

In most embodiments, nodes may host a database. In some embodiments, the database may be Cassandra. In certain embodiments, the database data may be stored in local disks on nodes. In further embodiments, the database may be for storing system's metadata and not for any of the index's data. In at least some embodiments, nodes may host a small instance of a lock service or locking service. In at least one embodiment, the locking service may be Zookeeper. In most embodiments, the locking service may provide the lock service for the nodes to coordinate with other nodes.

Partition Metadata

In most embodiments, the information about each partition in the system may be stored as an entry in a database. In certain embodiments, the entry may have the identifier for the partition (Virtual Storage Pool, divisor, remainder). In some embodiments, the entry may have the node identifier to specify which node is currently responsible for the partition. In at least one embodiment, the entry may have a location on the file share where the metadata record of the partition is stored. In at least some embodiments, a location may be identified by the file share identifier, the full path of the file, the offset in the file where the record begins, and the length of the record.

Metadata Record

In an embodiment, the metadata record of a partition may be stored in a file on the file share. In certain embodiments the metadata record may contains the information about the latest B+ tree of the partition, and position in the journal file. In some embodiments, the journal file may be used as a redo log for holding the data that hasn't been included in the B+ tree yet. In other embodiments, the location in the metadata record for the journal may contain the file share id, full file path, and the offset in the file. In most embodiments, the journal file may be on any file share, which need not be same file share where the B+ tree files and metadata record files are for that partition.

Journal

In certain embodiments, data transactions for partitions may be logged into the journal. In most embodiments, once enough entries are accumulated in journal, the entries may be inserted into a B+ tree, and the journal position may be advanced. In some embodiments, in the case the node responsible for the partition crashes, another node, which picks up the responsibility, may replay the transactions from the last journal position recorded in the metadata record.

B+ Tree

In an embodiment, a B+ tree structure may be maintained to store the keys belonging to the partition and corresponding values. In other embodiments, the pages of the B+ tree may be stored in the files on the file shares. In some embodiments, the location of pages in the tree may be identified by file share id, full file path and offset in the file. In other embodiments, the B+ tree may be spread across multiple file shares. In further embodiments, the B+ tree structure may support multiversion concurrency control and read snapshot isolation. In at least one embodiment, the existing pages may not be modified and modifications may be written as new pages in the file.

File System Structure

In an embodiment, a partition may have files for metadata record, B+ tree and journal. In certain embodiments, the B+ tree and journal may span multiple files. In other embodiments, each structure's location may be reached via a chain of pointers starting from the partition entry in Cassandra. In most embodiments, the partition structure may not be bound to a fixed location. In a particular embodiment, if a file share capacity is getting full, the journal writes and B+ tree modifications may be moved to another file share without break in continuity or consistency.

Finding Partition

In most embodiments, when a node gets a transaction for a key, it may calculate a hash value of the key. In certain embodiments, the node may query the database to find into which partition the key falls. In some embodiments, the partition information may be cached for future transactions. In alternative embodiments, a node may send the transaction to the node responsible for the key to execute the transaction. In other embodiments, if the cached information about the partition responsibility was stale the destination node may return a specific error code which may cause the source node to query the database and refresh the information to the latest sate.

Load Balancing

In an embodiment, if a node discovers that the responsibility division of the partitions is uneven, the node may take the responsibility from another node. In some embodiments, the consistent hashing scheme for partitioning may result in random and even distribution of the load. In at least some embodiments, the number of partitions may be the criteria for measuring even split of responsibility among the nodes.

In most embodiments, nodes periodically check the database for the partitions that the node is responsible for to see if the node is still the owner. In another embodiment, if a node wishes to take over ownership of a partition, the node may register itself as the owner in the database. In at least some embodiments, the node may wait for a periodic refresh interval for the original owner node to find out that the original node is not the owner anymore, and stop serving the transactions for the partition. In most embodiments, if a node is not able to reach the database, it may stop serving the transactions for the partition until the node can successfully validate that it is the owner. In further embodiments, if a node cannot reach the owner node for some time, the node may assume that the owner node is down and may take responsibility for the partition.

Object System

In some embodiments, an object system may be build on top of an indexing system. In certain embodiments, an object system may provide object semantics for creating objects, reading objects, reading and writing metadata associated with the object. In further embodiments, the object system may support byte range update on the object contents and atomic append to the object data. In most embodiments, the object system may support REST protocols and the related features of S3, Atmos and Swift. In further embodiments, an object service or object system may provide a single namespace that may span across multiple file shares.

Bucket

In certain embodiments, objects may be grouped in one or more bucket. In most embodiments, a bucket may support operations such as listing of all the objects in the bucket. In some embodiments, the list of object names in a bucket may be stored in an indexing system. In a particular embodiment, a SHA-256 of the bucket name may be used for deriving a hash id of the partition where the list is stored. In at least some embodiments, when an object is created, an entry may be made in the indexing system for the bucket id and object name. In other embodiments, the listing of bucket operations may go through the entries in the indexing for the bucket id.

Object Transactions

In an embodiment, each change or mutation to an object may be stored as a separate transaction. In most embodiments, storing each change as a separate transaction may provide a journal of changes to the object without overwriting the previous state. In certain embodiments, recording a separate object may enable snapshot read isolation. In further embodiments, querying the object at a given point in time may see the same consistent state of object throughout the read duration as it was when it started reading.

In other embodiments, the data associated with a change or mutation in an object may be written directly into a file on the fileshare. In certain embodiments, the location of the data may be stored in the indexing system as an update entry. In a particular embodiment, a given object may have many update entries in the index, each with location of the data on the file system. In at least some embodiments, a reader may need to go through all the update entries of an object to get the current state of the object. In some embodiments, the system may consolidate the update entries of an object when there are no readers. In alternative embodiments, SHA-256 of the object name may be used for deriving the hash id of the partition where the update entries for the object are stored.

Atomic Append

In certain embodiments, multiple transactions for atomically appending the data to the object may be issued. In some embodiments, the update sequencing on the server side of the indexing system may order the append transactions and may provide the atomicity.

Native File Access for Object Data

In an embodiment, the file access feature may provide ability to access the object data through the native file system interface of the NAS device by mounting the fileshare. In certain embodiments, the user may send a request to get file access for a bucket. In some embodiments, the system may return the full file path for each of the objects in the bucket. In other embodiments, modifications made through the file interface on those objects may be reflected in the object data. In at least some embodiments, during modifications to the object through REST interface may be prevented. In alternative embodiments, when a user is done with file access, the REST interface may be accessible. In at least one embodiment, internally the system may consolidate the update entries and data of an object and may place them into a single file before giving the file out for file access.

Refer now to the simplified embodiment of FIG. 1. In the example embodiment of FIG. 1, indexing system 125 has locking service 112, nodes 130, 132, 134, and 136, and database 110. Database 110 has storage pool 114. Storage pool 114 has gold storage 114 and bronze storage 118. Site 105 has array 135, 140, 145, 185, 180, and 190. Each array has two levels of storage such as Gold, Bronze or Platinum. For example array 135 has gold and bronze service levels. Each node, 130, 132, 134, and 136 is connected through network 147 to each storage array 135, 140, 145, 180, 185, and 190. Each of the arrays may be stored in database 110 as belong to one or more storage pools based on the Class of Services offered by that storage array. Each node 130, 132, 145, and 135 has access to an object system and an index system. In certain embodiments, the object system may be for storing objects. In some embodiments, the index system may be for storing the location of the stored objects for scalable access.

Figure 2:
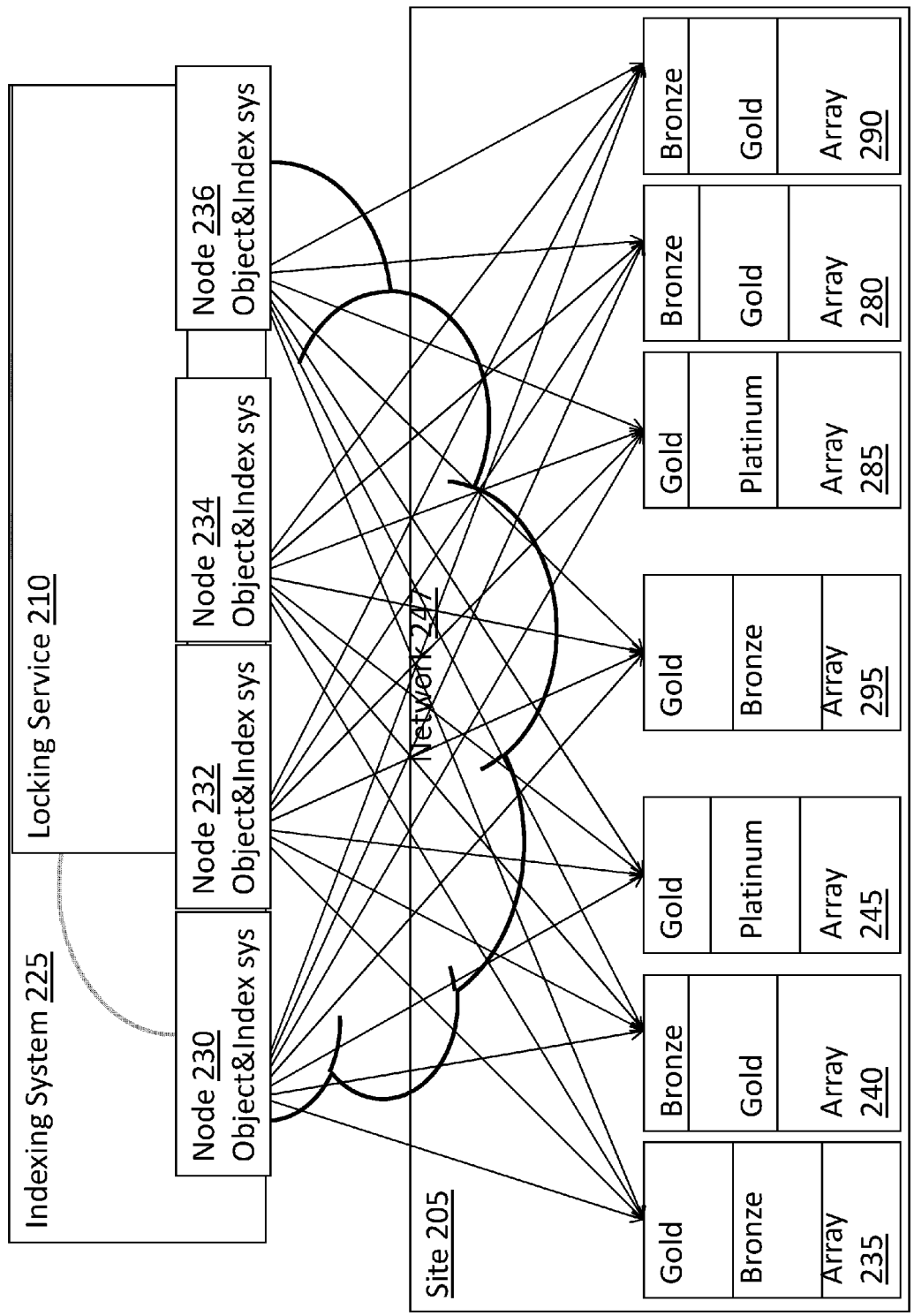
FIG. 2 is a simplified illustration of adding an array in a data storage environment, in accordance with an embodiment of the present disclosure.
Figure 3:
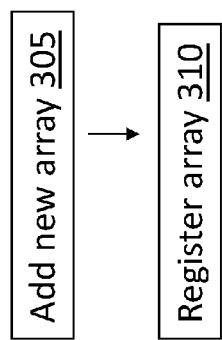
FIG. 3 is a simplified example of a method for adding an array in a data storage environment, in accordance with an embodiment of the present disclosure.

Refer now to the example embodiments of FIGS. 2 and 3. In FIG. 2, array 295 has been added to site 205 (step 305). Storage Array 295 has been registered with nodes 230, 232, 234, and 236 (step 310). In this way, subsequent arrays may be added to site 205 and registered with the nodes and indexing system.

Figure 4:
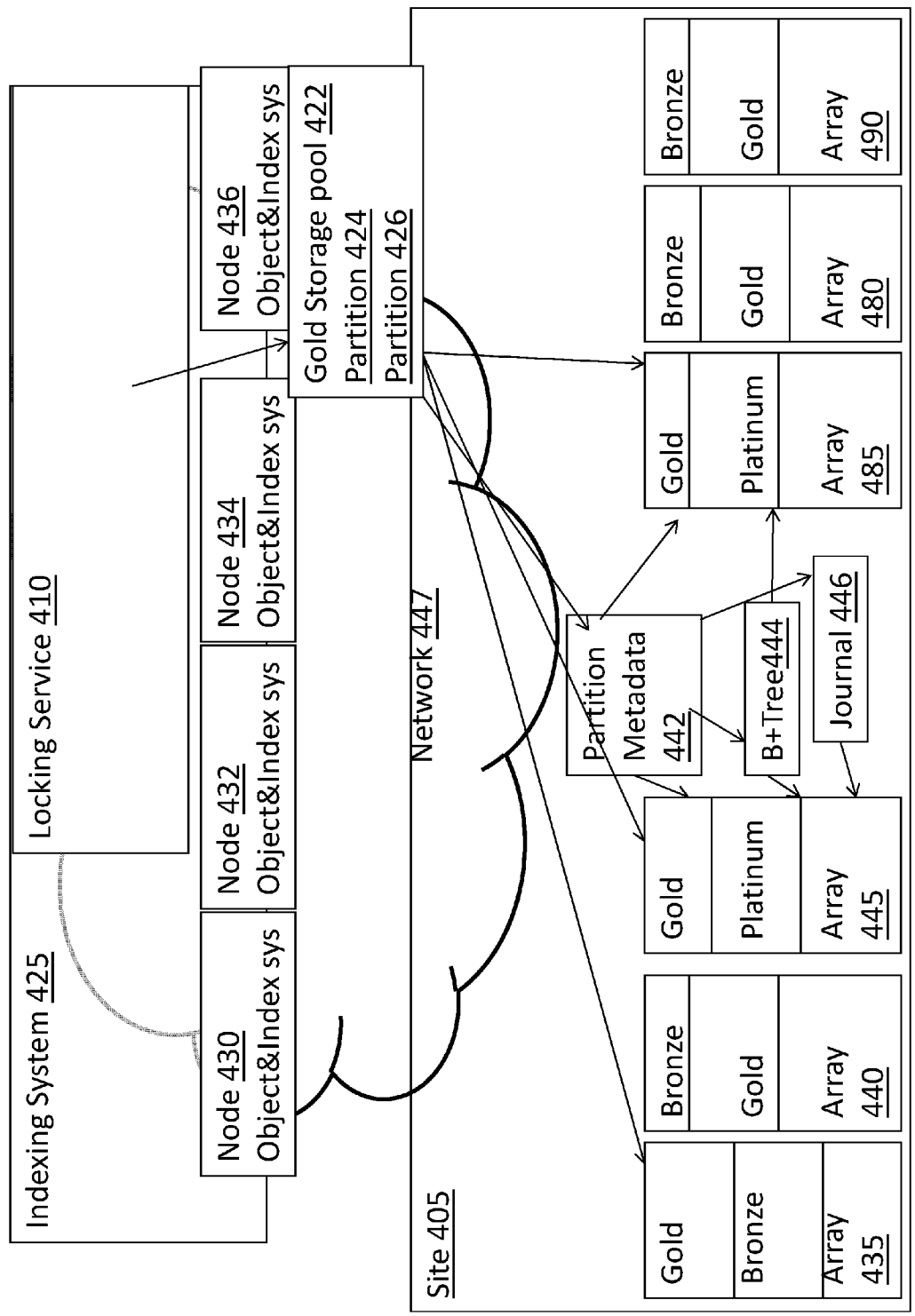
FIG. 4 is a simplified alternative illustration of a class of service in data storage environment, in accordance with an embodiment of the present disclosure.
Figure 5:
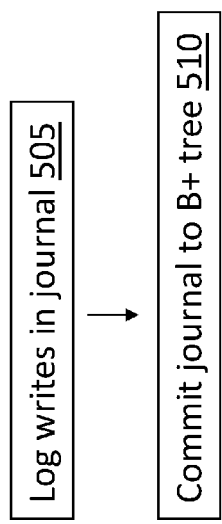
FIG. 5 is a simplified example of a method for logging writes in a journal in a data storage environment and committing the journal to a B+ tree, in accordance with an embodiment of the present disclosure.

Refer now to the example embodiments of FIGS. 4 and 5, which illustrate committing journal entries to a B+ tree. When mutations are received to objects in an indexing system, the mutations are recorded in journal 446 on storage array 445 (step 505). After journal 446 has reached a certain size, the transactions in journal 446 are committed to B+tree 444. B+Tree 444 is stored on arrays 445 and 485. As B+Tree 444 is a tree, each node of the tree may be stored on a different array with a pointer pointing to the next node.

Figure 6:
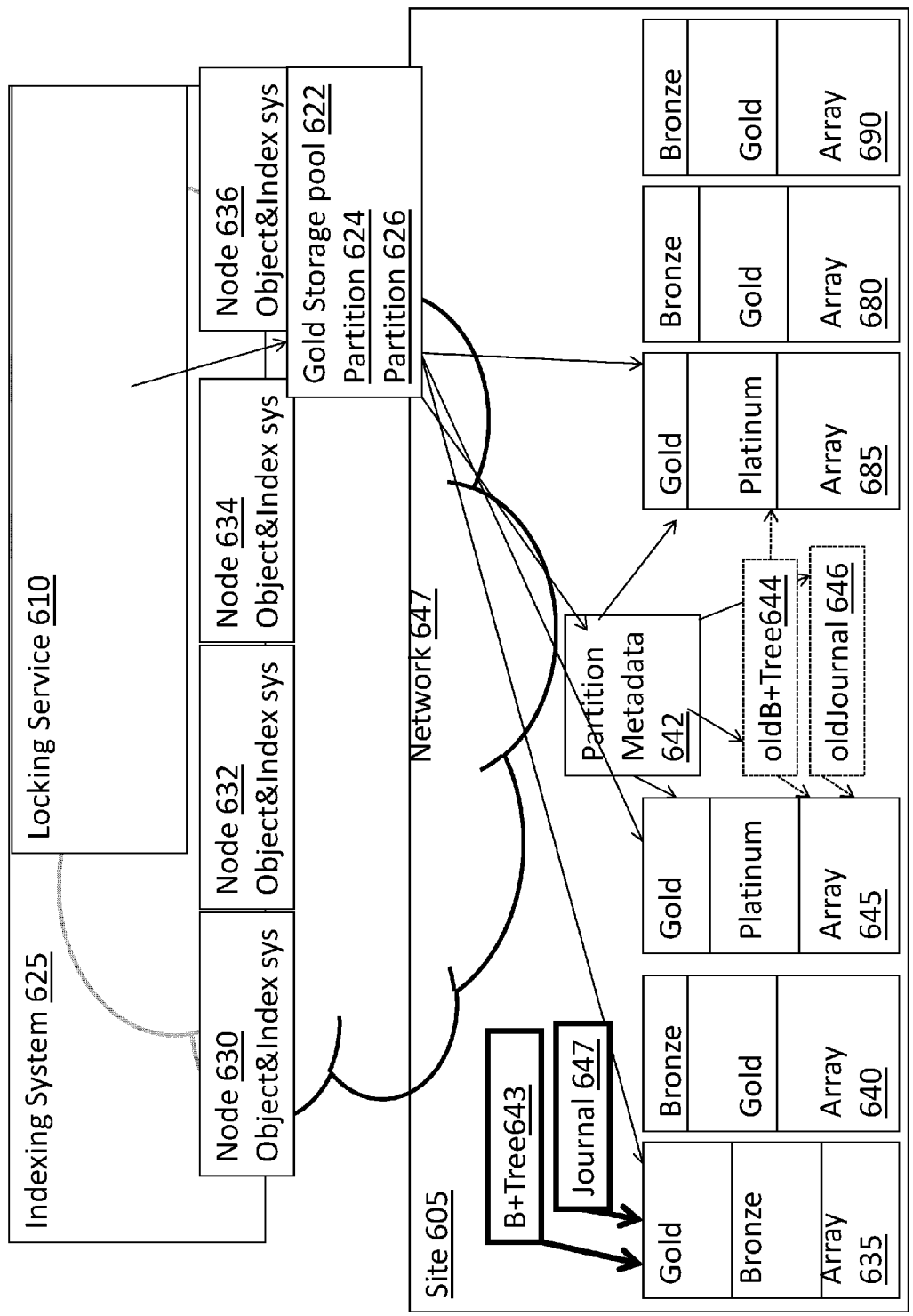
FIG. 6 is a simplified alternative illustration of moving a journal and subsequent entries in a B+ tree in data storage environment, in accordance with an embodiment of the present disclosure.
Figure 7:
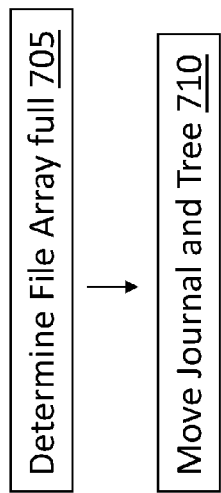
FIG. 7 is a simplified example of a method for moving a journal and subsequent entries in a B+ tree to another array in a data storage system, in accordance with an embodiment of the present disclosure.

Refer now to the example embodiments of FIGS. 6 and 7, which illustrate moving the recording of mutations in a B+tree and journal to a different array from a first tree. Partition metadata 642 has oldB+tree 644, oldJournal 646, B+Tree 643, and Journal 647. It has been determined that file array 645 is full (705). Mutations to metadata 642 to oldB+tree 644 and oldJournal 646 are stopped. New mutations to metadata 642 are recorded in B+tree 643 and journal 647 on array 635 (step 710).

Figure 8:
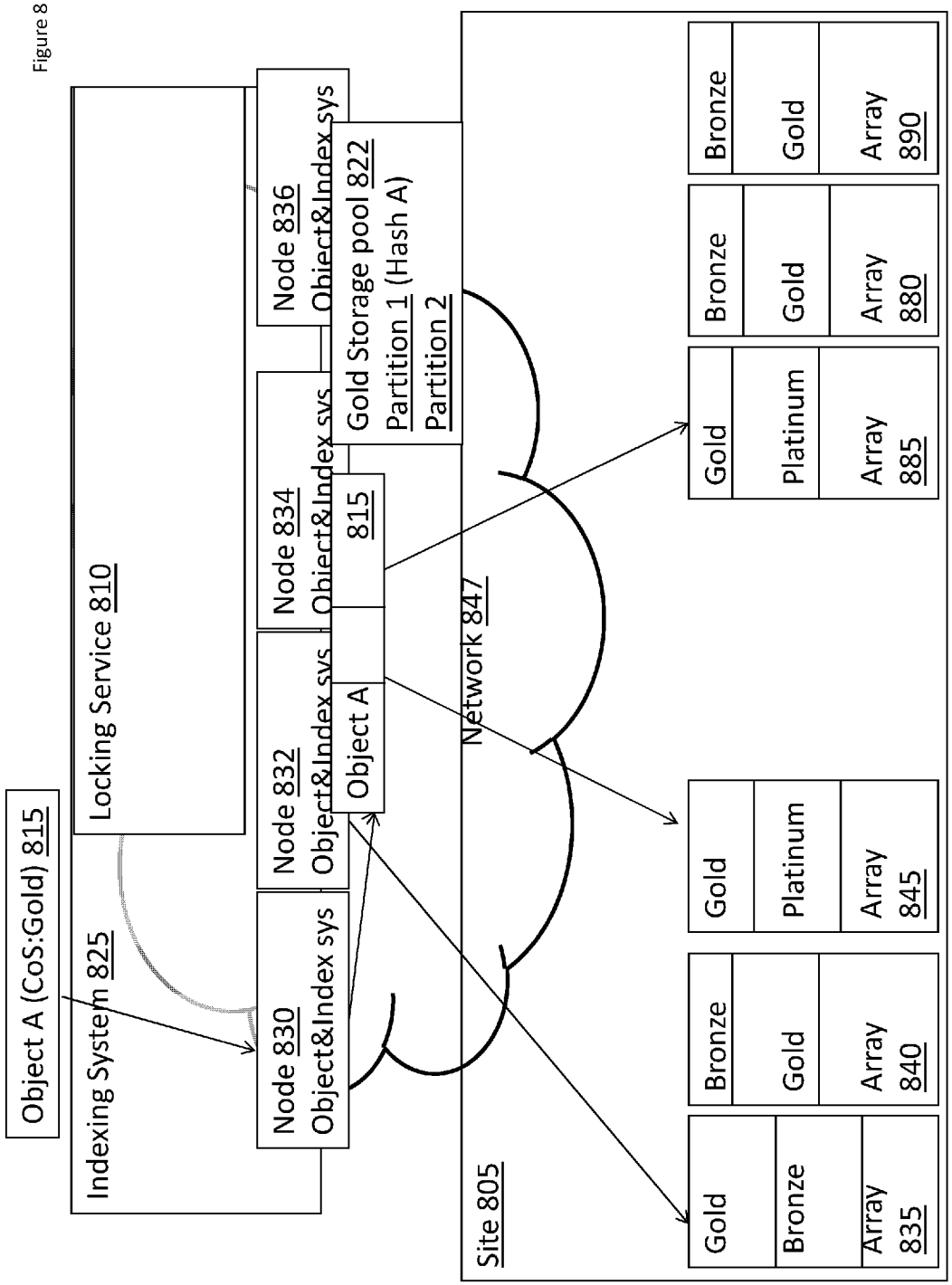
FIG. 8 is a simplified illustration of adding an object to an indexing system in data storage environment, in accordance with an embodiment of the present disclosure.
Figure 9:
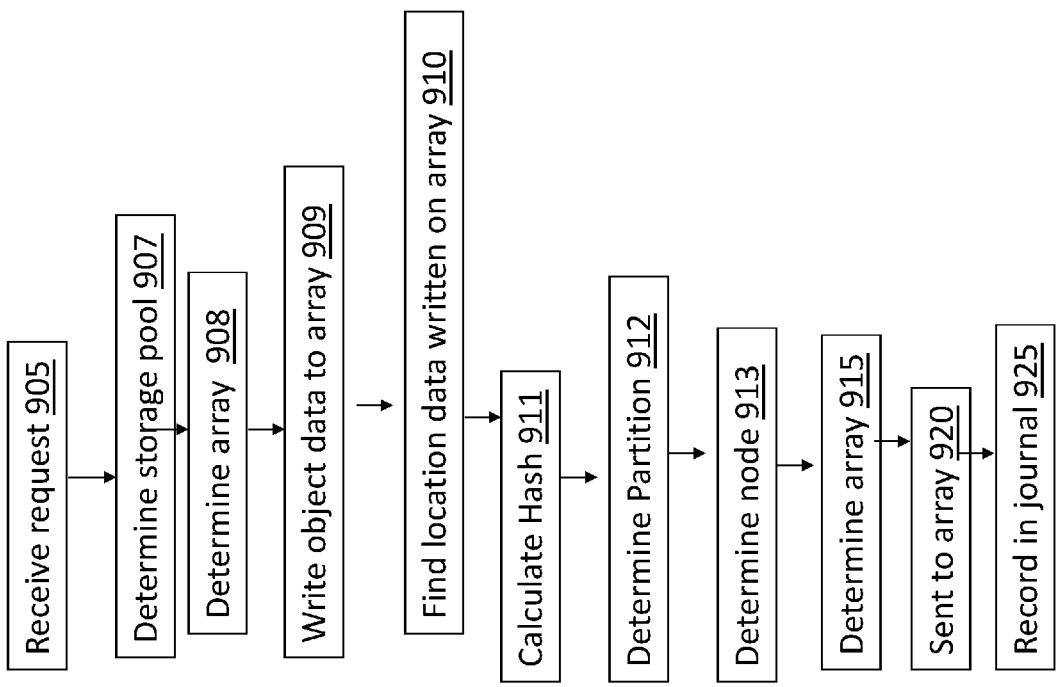
FIG. 9 is a simplified example of a method for adding a new object to be stored in a data storage system, in accordance with an embodiment of the present disclosure.

Refer now to the example embodiments of FIGS. 8 and 9, which illustrate a new object with a requested Class of service gold being recorded in an indexing system. Object A 815 is being broken up and stored on arrays 835, 845 and 885 based on a request for a gold class of service for this object. A request for creation and storing of object 815 is received (step 905). Object system, via node 830, determines in which storage pool object 815 is to be stored (step 907). Object system, via node 830, determines on which array or arrays the object is to be stored (step 908). Object system, via node 830, writes object data to the array (909). Object system via node 830 finds the location data written on the array (step 910). The hash for object 815 is calculated (step 911). A partition for object 815 is determined and stored in indexing system via node 830 (step 912). A node for object 815 is determined is determined by indexing system via node 830 (step 913). An array is determined for object 815 by indexing system via node 830 (step 915). Object 815 is sent to array (step 920). The object write is recorded in the journal (step 925).

Figure 10:
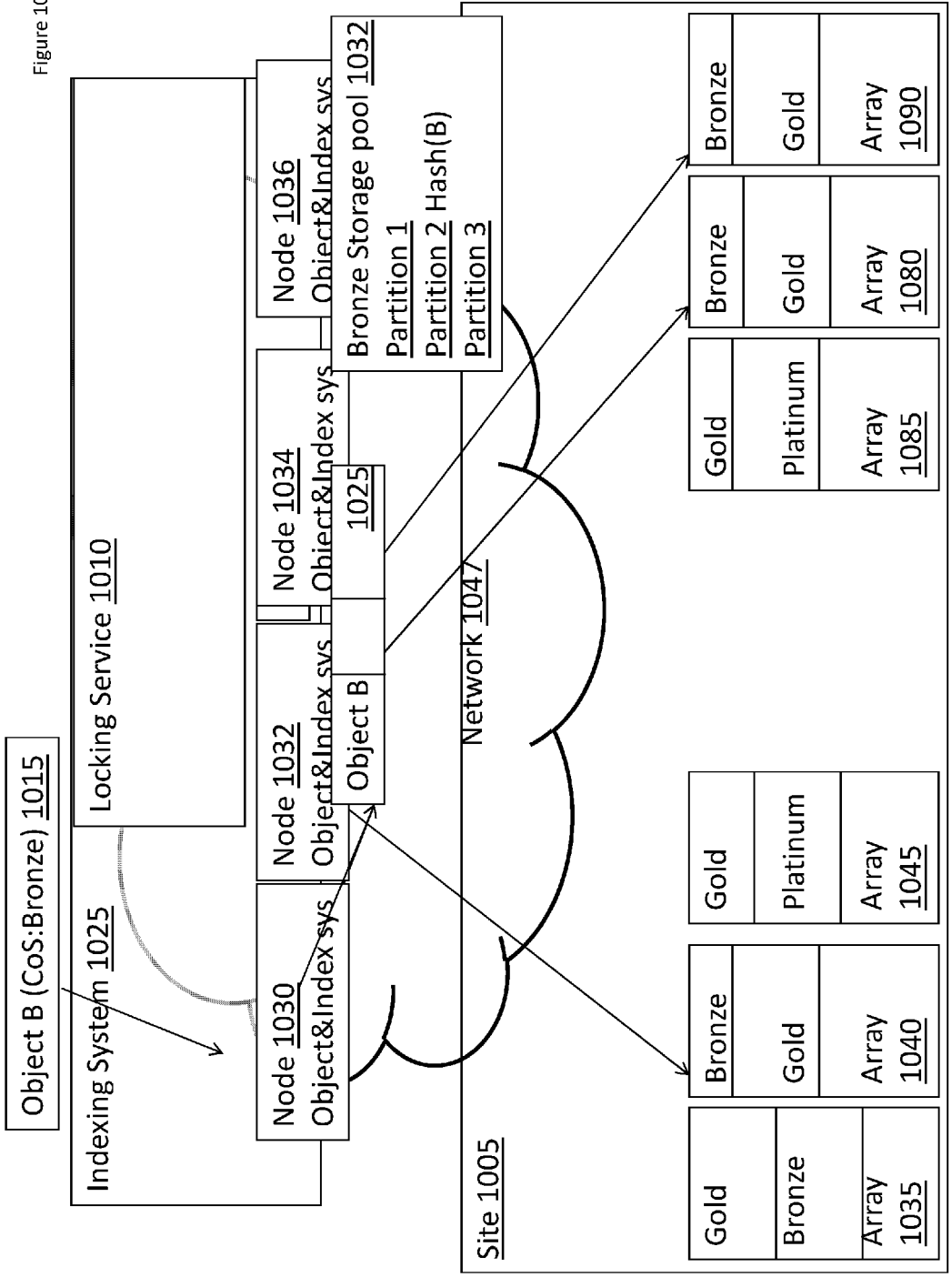
FIG. 10 is a simplified illustration of adding an object to an indexing system in data storage environment, in accordance with an embodiment of the present disclosure.

Refer now to the example embodiments of FIGS. 9 and 10, which illustrate a new object with a requested class of service of bronze being recorded in an indexing system. Object B 1015 is being broken up and stored on arrays 1040, 1080 and 1090 based on a request for a bronze class of service for this object. A request for creation and storing of object 1015 is received (step 905). Object system, via node 1030, determines in which storage pool object 1015 is to be stored (step 907). Object system, via node 1030, determines on which array or arrays the object is to be stored (step 908). Object system, via node 1030, writes object data to the array (909). Object system via node 830 finds the location data written on the array (step 910). The hash for object 1015 is calculated (step 911). A partition for object 1015 is determined and stored in indexing system via node 830 (step 912). A node for object 1015 is determined is determined by indexing system via node 830 (step 913). An array is determined for object 1015 by indexing system via node 1030 (step 915). Object 1015 is sent to array (step 920). The object write is recorded in the journal (step 925).

Figure 11:
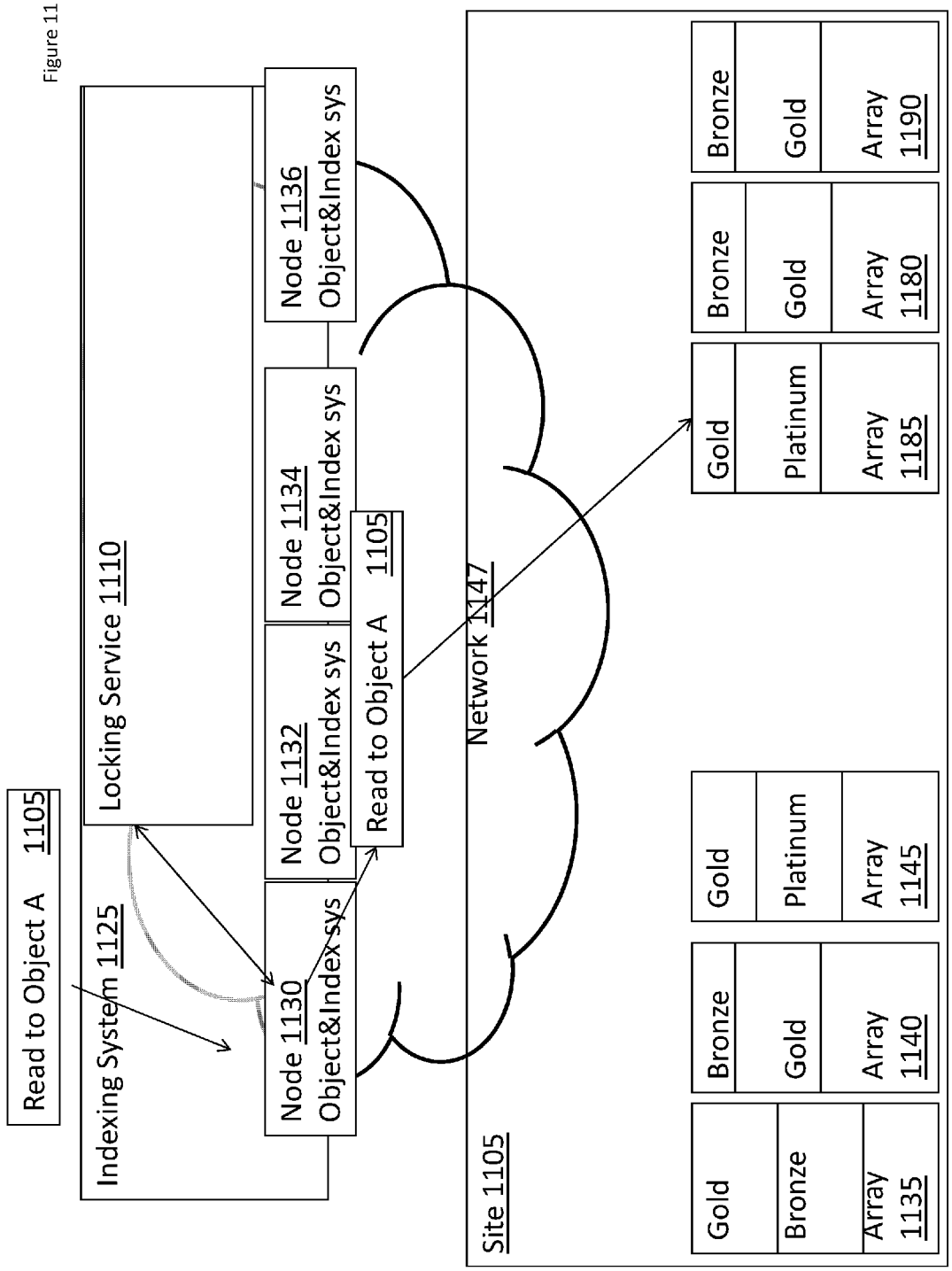
FIG. 11 is a simplified illustration of reading an object in data storage environment, in accordance with an embodiment of the present disclosure.
Figure 12:
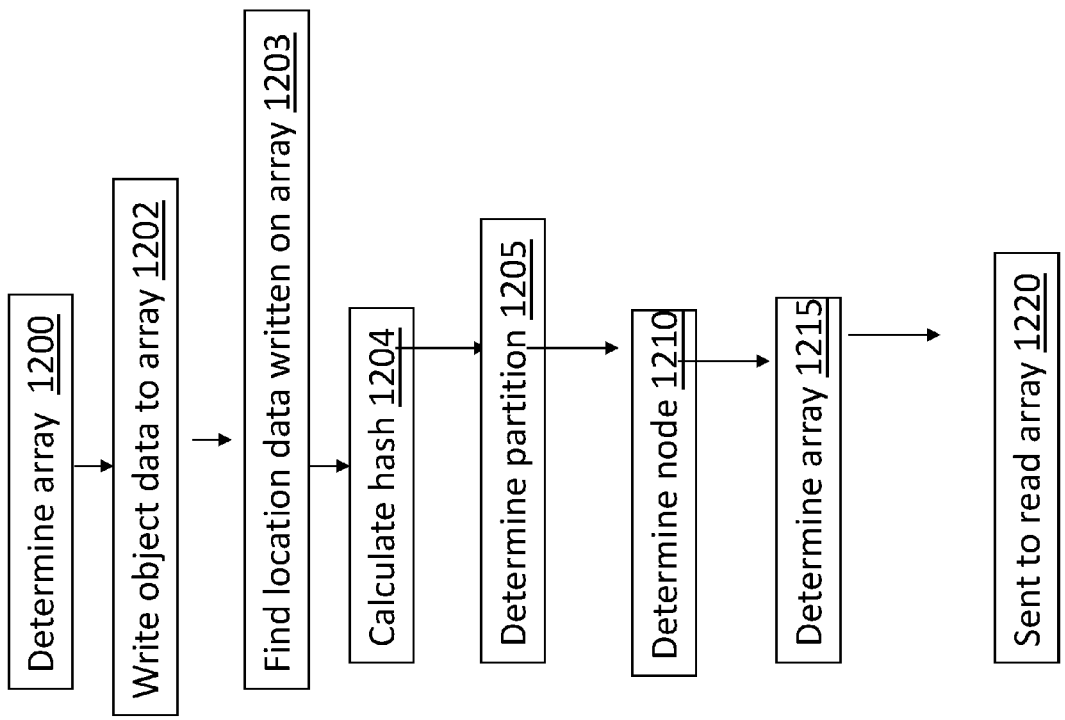
FIG. 12 is a simplified example of a method for reading an object stored in a data storage system, in accordance with an embodiment of the present disclosure.

Refer now to the example embodiments of FIGS. 11 and 12, which illustrate a read to an object stored in an indexing system. Indexing system receives read to object A 1105. Indexing system 1125 determines on which array object A 1105 is stored (step 1200). Indexing system 1125 writes the object data to the array (step 1202). Indexing system finds the location the data is written on the array (step 1203). Indexing system 1125 calculates the hash for object A 1105 (step 1204). Indexing system 1125 determines the partitions on which object A 1105 is stored (step 1205). Indexing system 1125 determines the node handling the partition (step 1205). Node 1130 determines the array 1185 (step 1215). Node 1130 sends the read to the array 1185 (step 1220).

Figure 13:
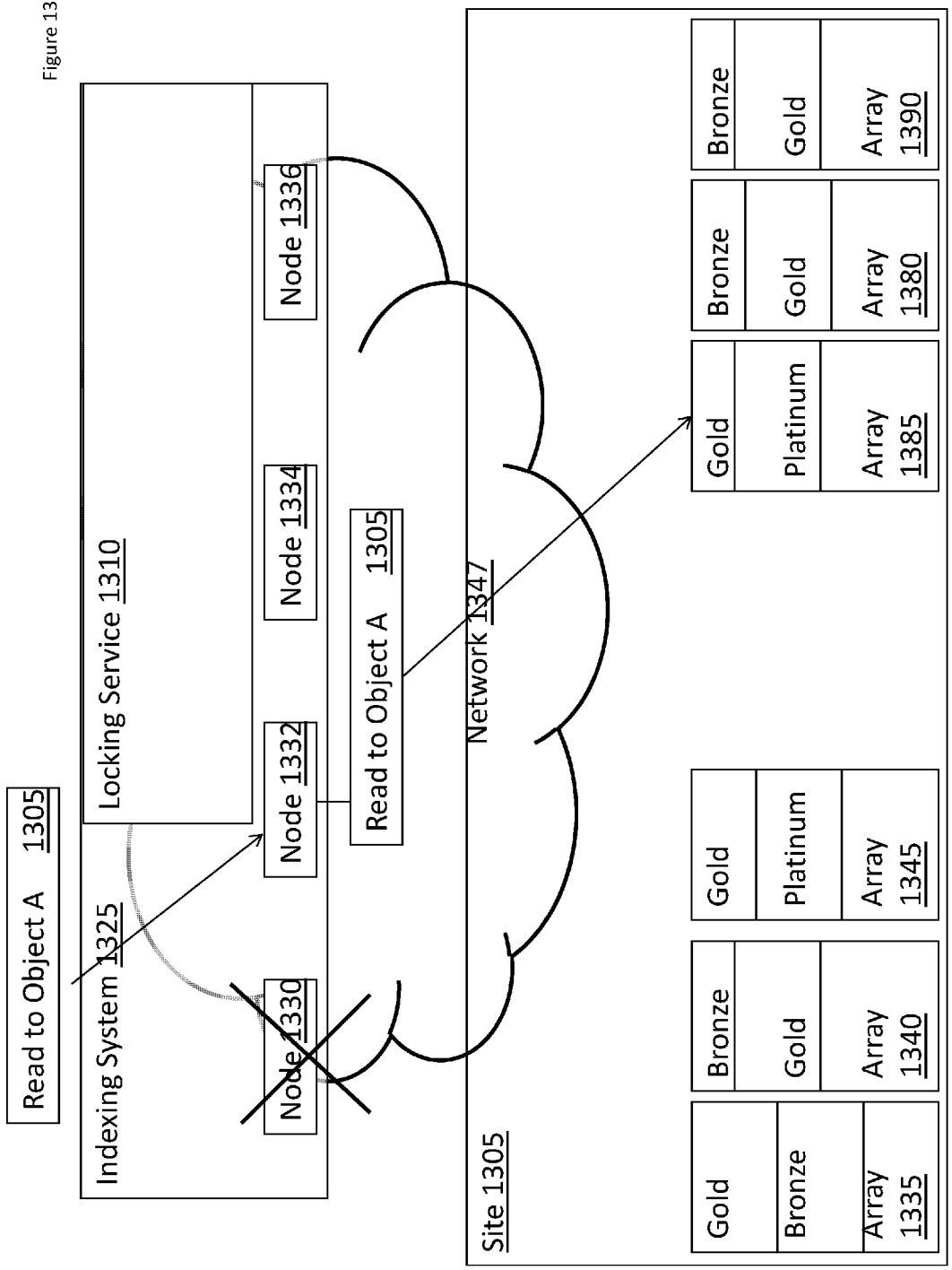
FIG. 13 is a simplified illustration of reading an object in data storage environment given a node failure, in accordance with an embodiment of the present disclosure.
Figure 14:
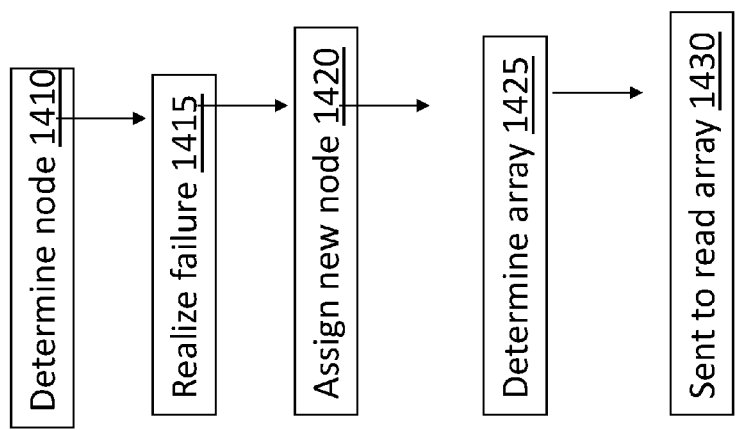
FIG. 14 is a simplified example of a method for reading an object stored in a data storage system given a node failure, in accordance with an embodiment of the present disclosure.

Refer now to the example embodiments of FIGS. 13 and 14, which illustrate handling a node failure. Indexing system 1325 receives a read to object A 1305 and determines which node is to handle reads to this object (step 1410). Indexing system 1325 realizes there is a failure in node 1330, the previously determined node (step 1415). Indexing system assigns new node 1332 to handle the read for object A 1305 (step 1420). Node 1332 determines array 1385 has the information for the read (step 1425). Node 1330 sends the read to the array (step 1430).

Figure 15:
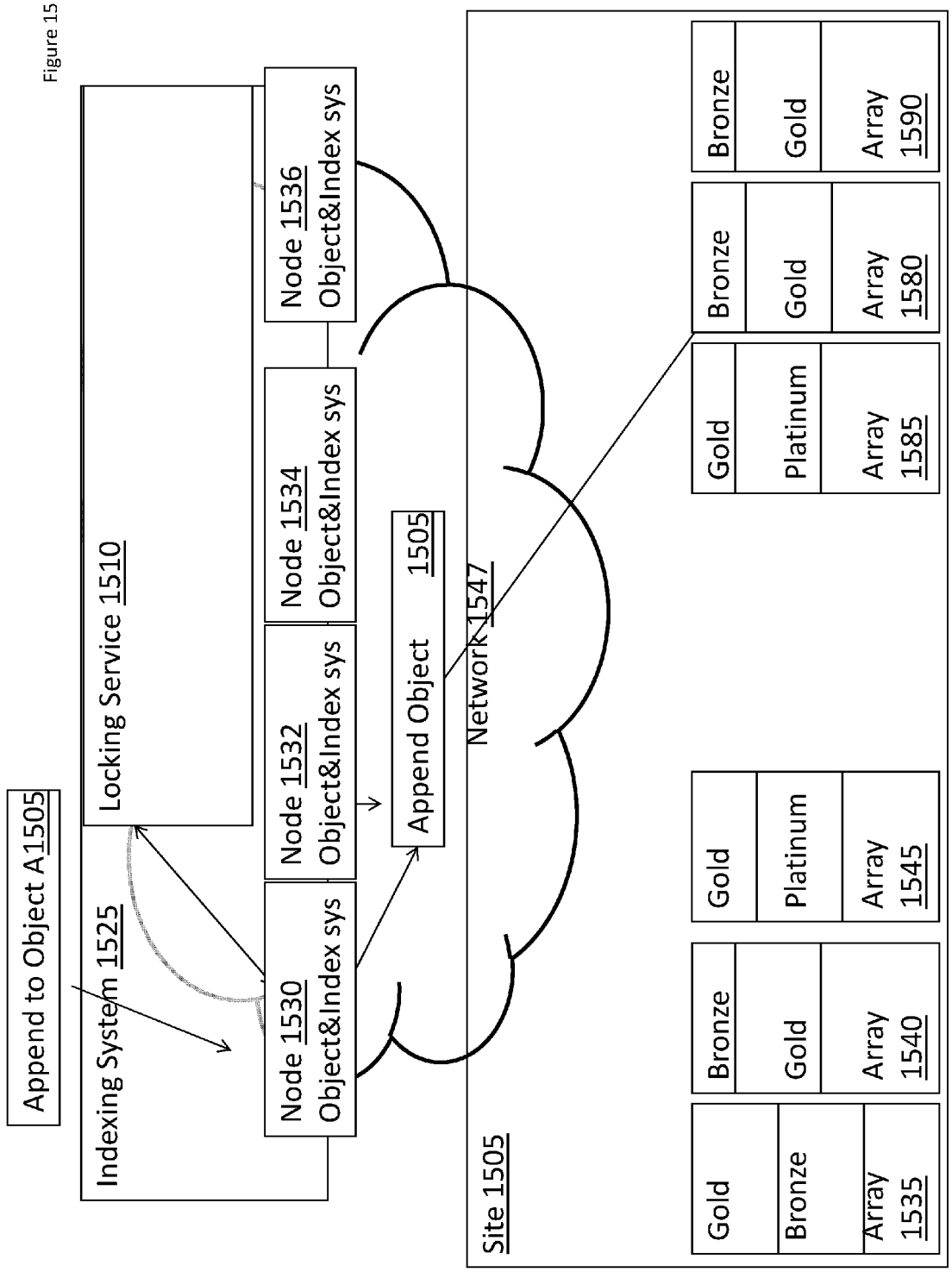
FIG. 15 is a simplified illustration of appending data to an object in data storage environment, in accordance with an embodiment of the present disclosure.
Figure 16:
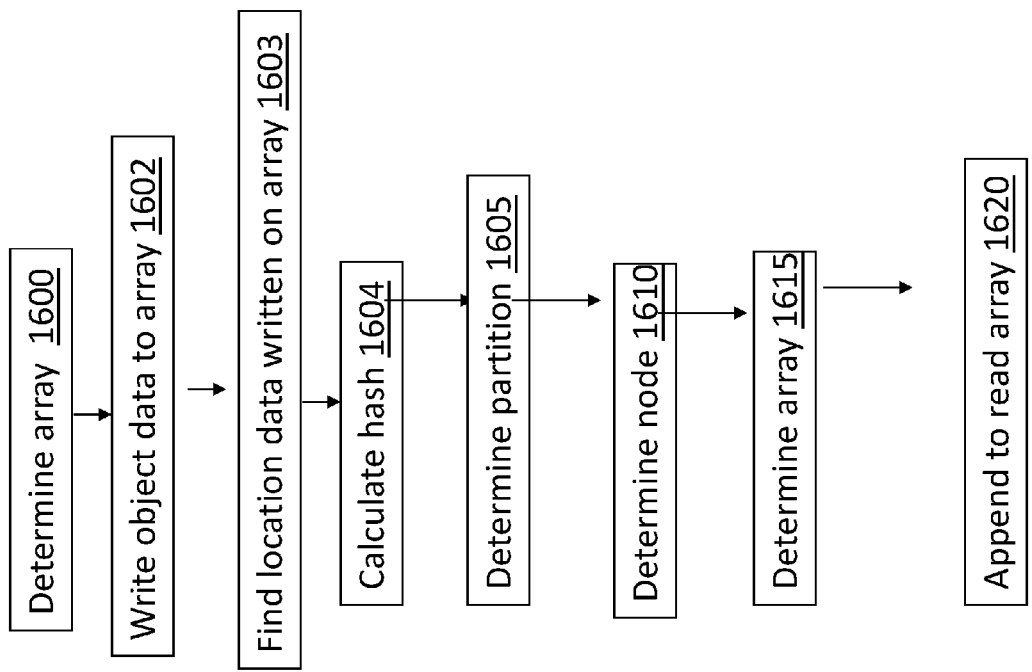
FIG. 16 is a simplified example of a method for appending data to an object stored in a data storage system, in accordance with an embodiment of the present disclosure.

Refer now to the example embodiments of FIGS. 15 and 16, which illustrate handling an append to an object. Indexing system receives read to object A 1505. Indexing system 1525 determines on which array object A 1505 is stored (step 1600). Indexing system 1525 writes the object data to the array (step 1602). Indexing system finds the location the data is written on the array (step 1603). Indexing system 1525 calculates the hash for object A 1505 (step 1604). Indexing system 1525 determines the partitions on which object A 1505 is stored (step 1605). Indexing system 1525 determines the node handling the partition (step 1605). Node 1530 determines the array 1185 (step 1615). Node 1530 sends the read to the array 1585 (step 1620).

Figure 17:
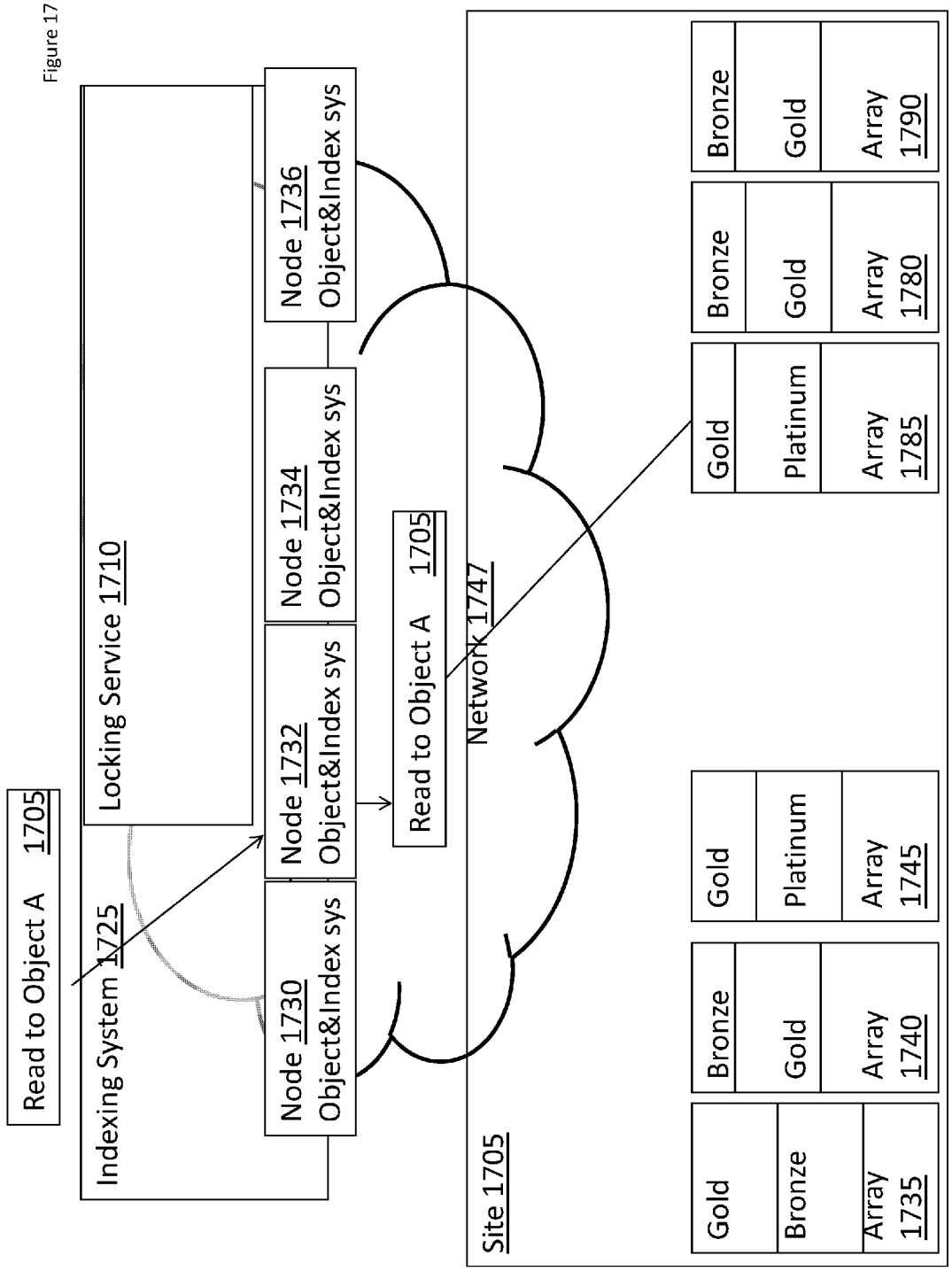
FIG. 17 is a simplified illustration of node balancing in data storage, in accordance with an embodiment of the present disclosure.
Figure 18:
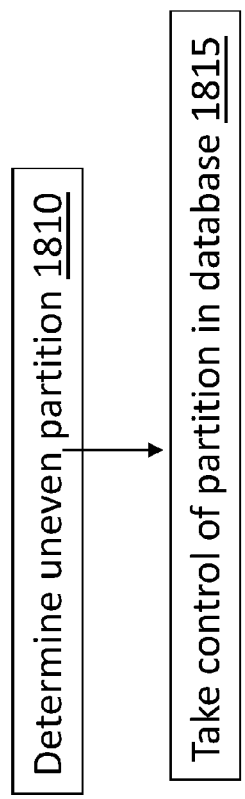
FIG. 18 is a simplified example of a method for load balancing in a data storage system, in accordance with an embodiment of the present disclosure.

Refer now to the example embodiments of FIGS. 17 and 18, which illustrate a node determining an uneven partition allocation and taking control of a partition. Node 1732 determines that node 1730 has an uneven allocation of partitions (step 1810). Node 1732 takes control of one of node 1730's partitions to service read to object A 1705 (step 1815).

Figure 19:
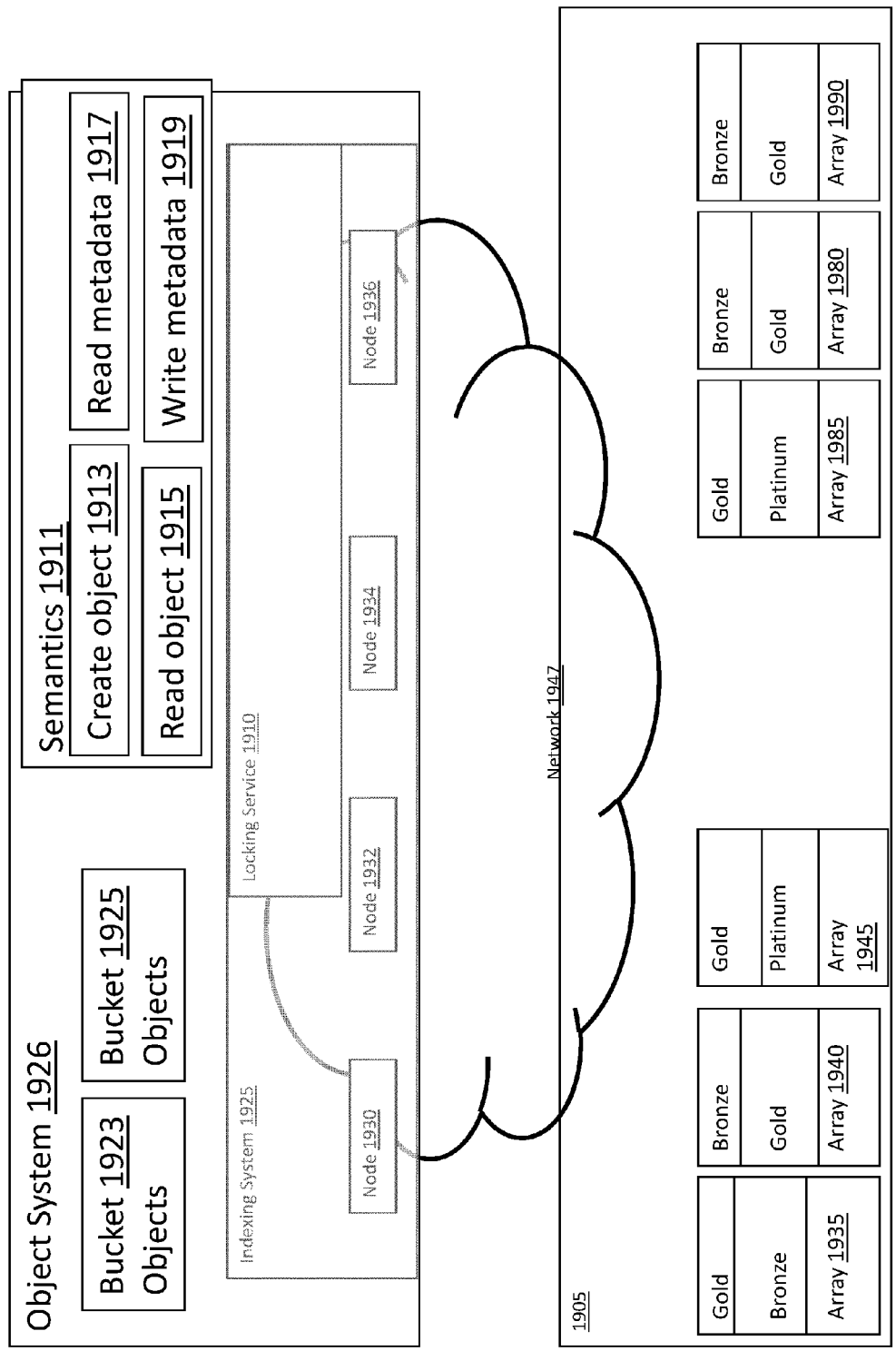
FIG. 19 is a simplified illustration of an object system in a data storage environment, in accordance with an embodiment of the present disclosure.

Refer now to the example embodiment of FIG. 19, which illustrates an object system layered over an indexing system. Object system 1926 has semantics 1911, bucket objects 1923 and 1925, and indexing system 1925. Semantics 1911 has the ability to create objects 1913, read objects 1915, read metadata 1917, and write metadata 1919. Buckets 1923 and 1925 contain objects and are classifiers for objects. Object system 1926 is connected to storage location 1905 by network 1947. Storage location 1905 has arrays 193, 1940, 1945, 1985, 1980, and 1990.

Figure 20:
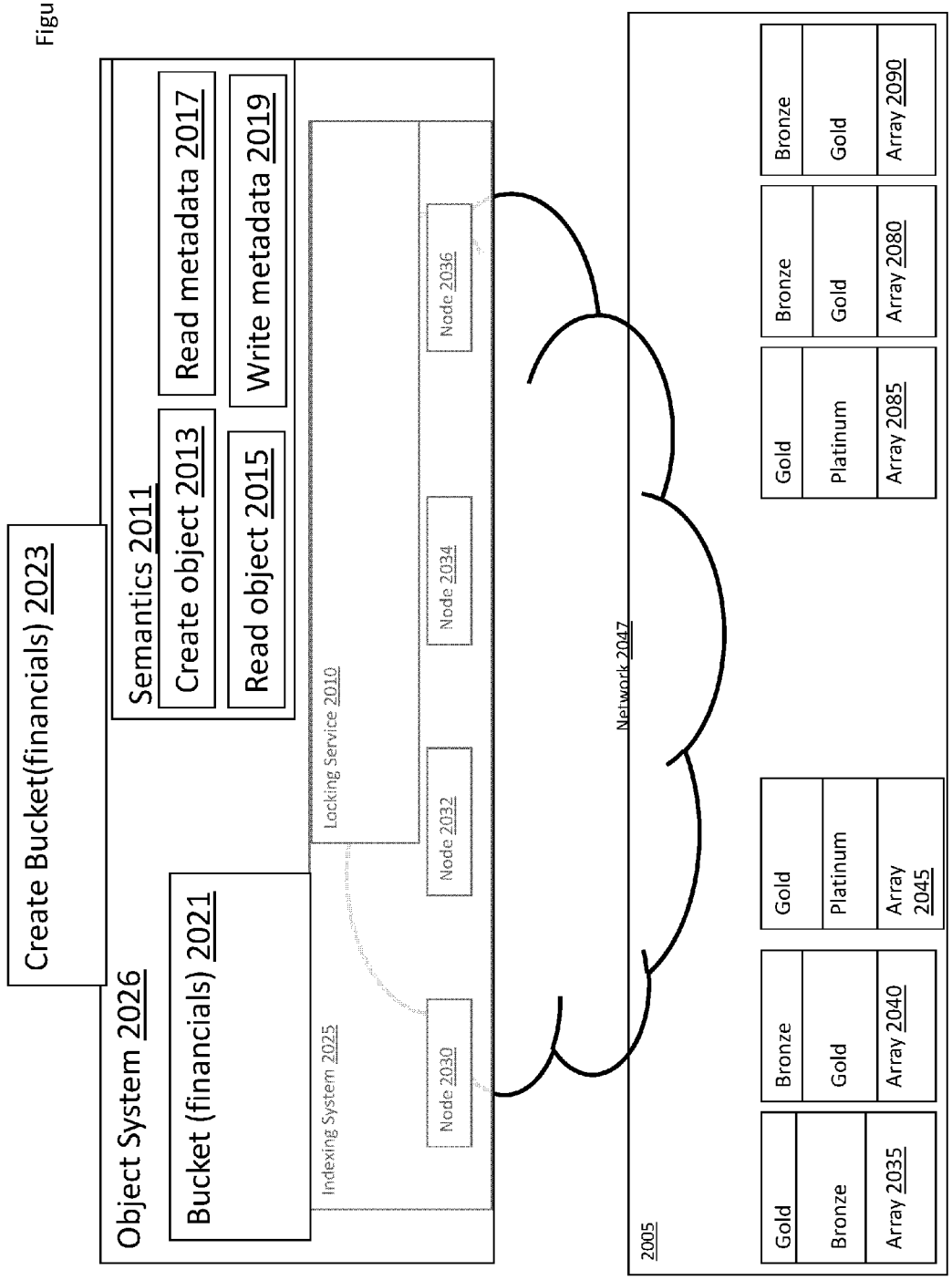
FIG. 20 is a simplified illustration of creating a bucket in a data storage system, in accordance with an embodiment of the present disclosure.
Figure 21:
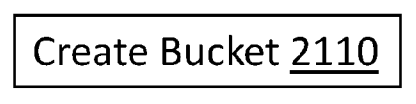

Refer now to the example embodiments of FIGS. 20 and 21, which illustrate creating a bucket. Object system 2026 receives a request to create bucket (financials) 2023. Object system 2026 creates bucket financials 2021 (step 2110). Note in this embodiment that bucket financials does not contain objects as none have been added to this bucket.

Figure 22:
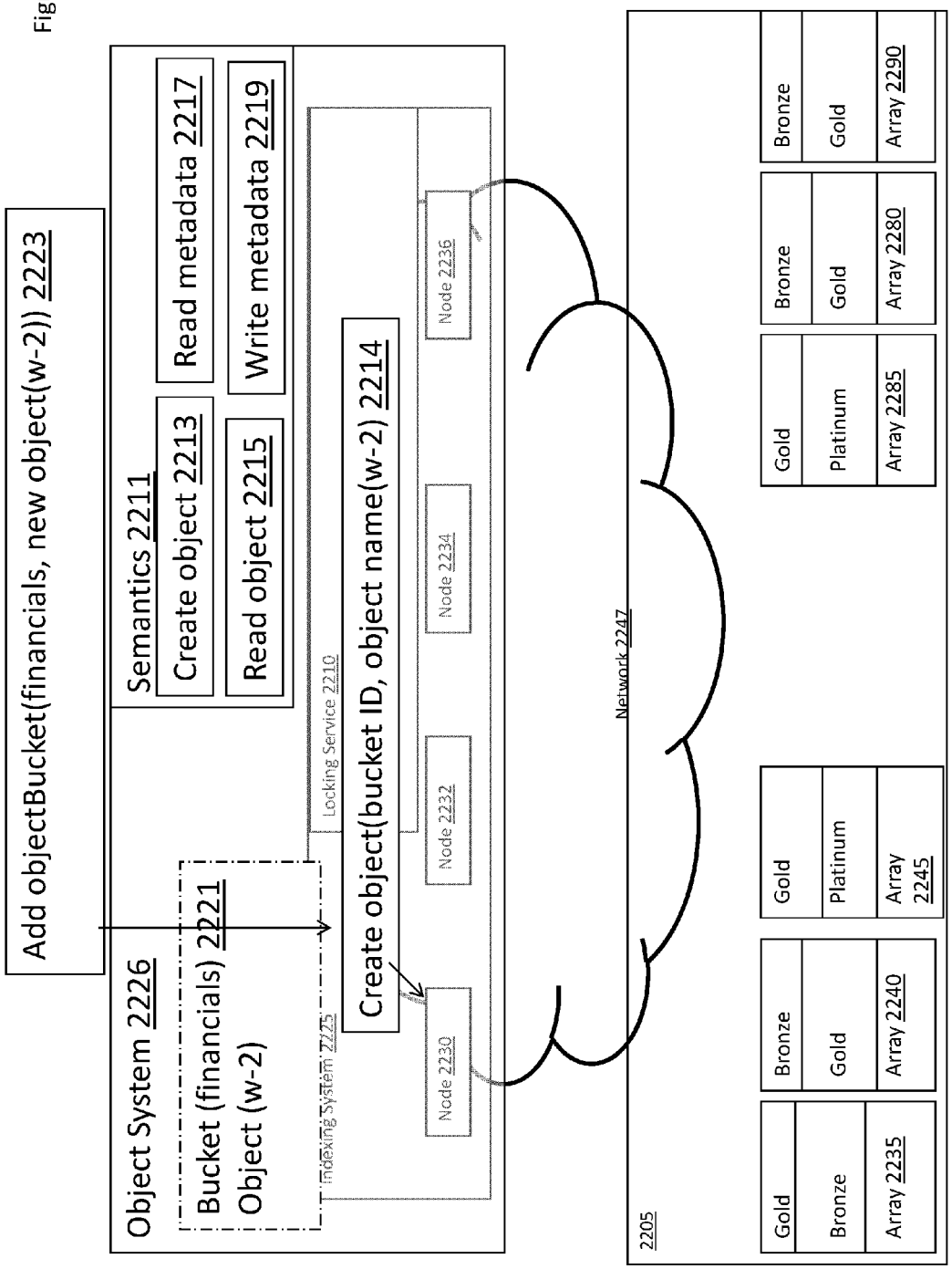
FIG. 22 is a simplified illustration of creating an object in a bucket in a data storage system, in accordance with an embodiment of the present disclosure.
Figure 23:
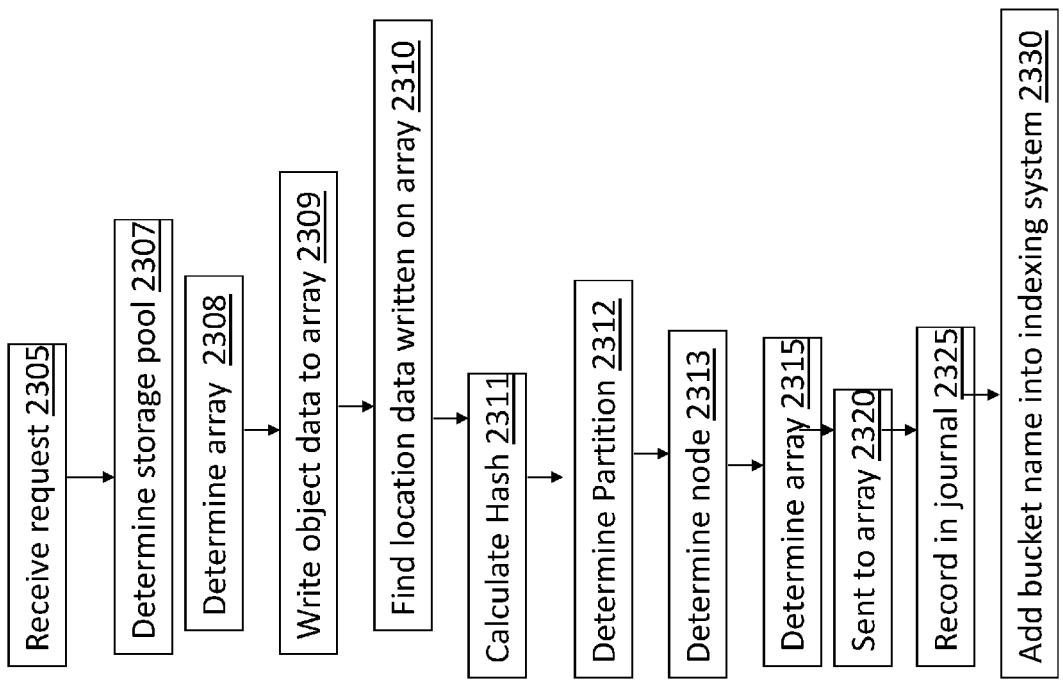
FIG. 23 is a simplified example of a method for creating an object in a bucket in a data storage system, in accordance with an embodiment of the present disclosure.

Refer now to the example embodiments of FIGS. 22 and 23. Object system 2226 receives a request 2223 to add an object to a bucket, where the object has not yet been created.

Object system, via node 2230, determines in which storage pool object 2214 is to be stored (step 2307). Object system, via node 2230, determines on which array or arrays the object is to be stored (step 2308). Object system, via node 2230, writes object data to the array (2309). Object system via node 2230 finds the location data written on the array (step 2310). The hash for object 2215 is calculated (step 2311). A partition for object 2215 is determined and stored in indexing system via node 2230 (step 2312). A node for object 2215 is determined is determined by indexing system via node 2230 (step 2313). An array is determined for object 2215 by indexing system via node 2230 (step 2315). Object 2215 is sent to array (step 2320). The object write is recorded in the journal (step 2325). The bucket name is added by node 2230 to the indexing system (step 2330).

Figure 24:
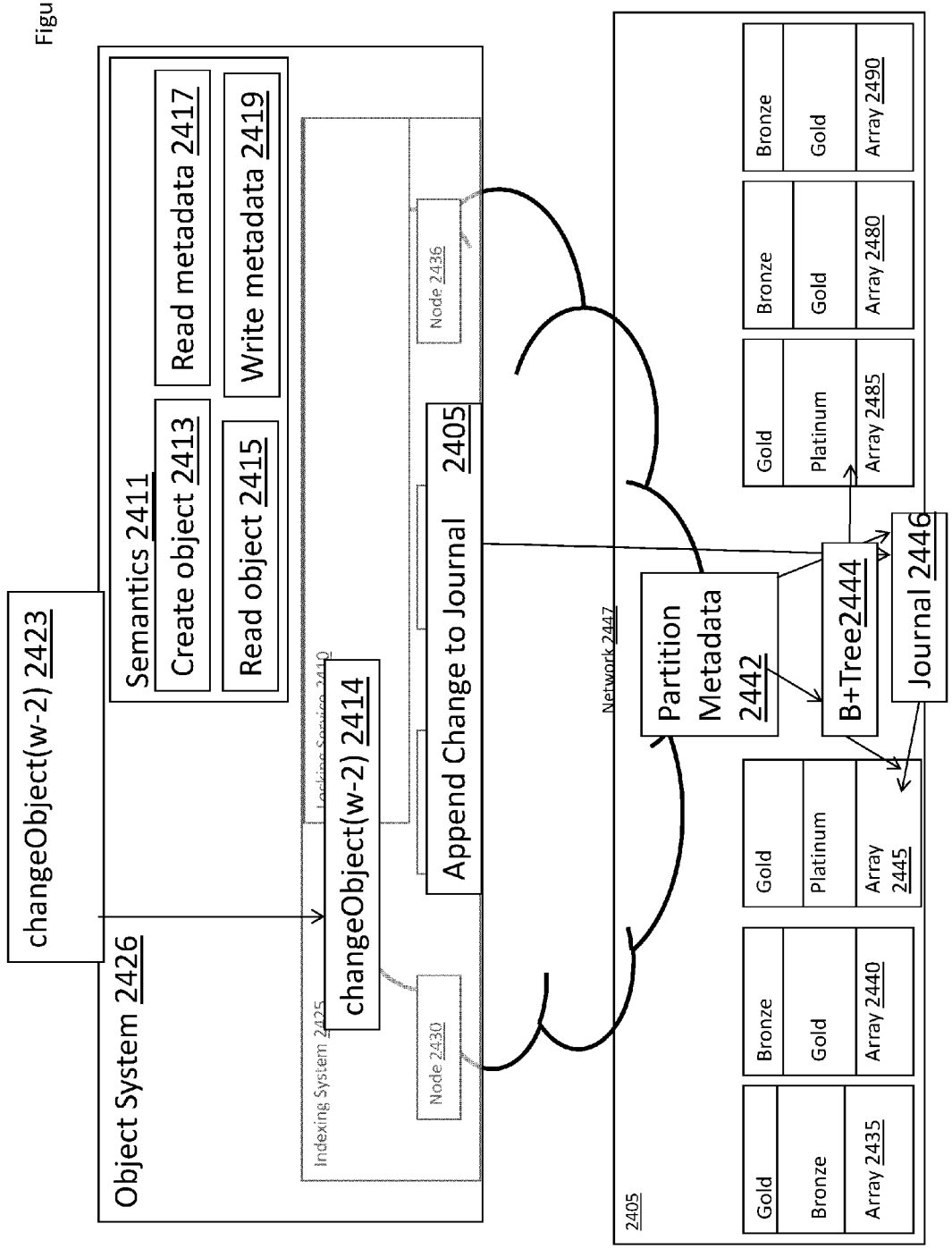
FIG. 24 is a simplified illustration of appending to an object in a bucket in a data storage system, in accordance with an embodiment of the present disclosure.
Figure 25:
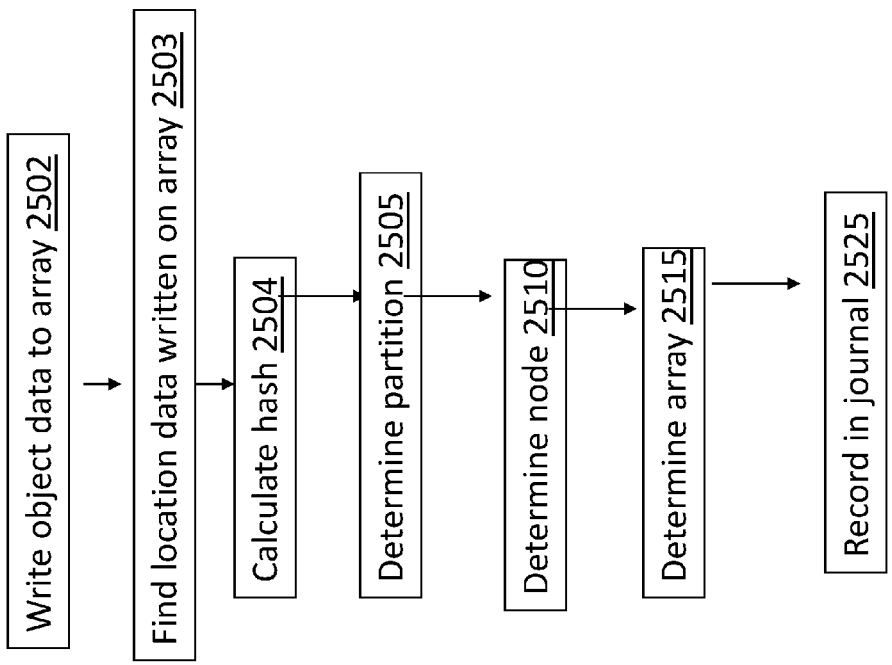
FIG. 25 is a simplified example of a method for appending to an object in a bucket in a data storage system, in accordance with an embodiment of the present disclosure.

Refer now to the example embodiments of FIGS. 24 and 25. Indexing system 2425 writes the object data to the array (step 2502). Indexing system finds the location the data is written on the array (step 2503). Indexing system 2425 calculates the hash for object A 2405 (step 2504). Indexing system 2425 determines the partitions on which object A 2405 is stored (step 2505). Indexing system 2525 determines the node handling the partition (step 2505). Node 2430 determines the array 2485 (step 2515). Node 1530 sends the read to the array 1585 (step 1620). The data that is changed is recorded in journal 2446 (step 2525).

Figure 26:
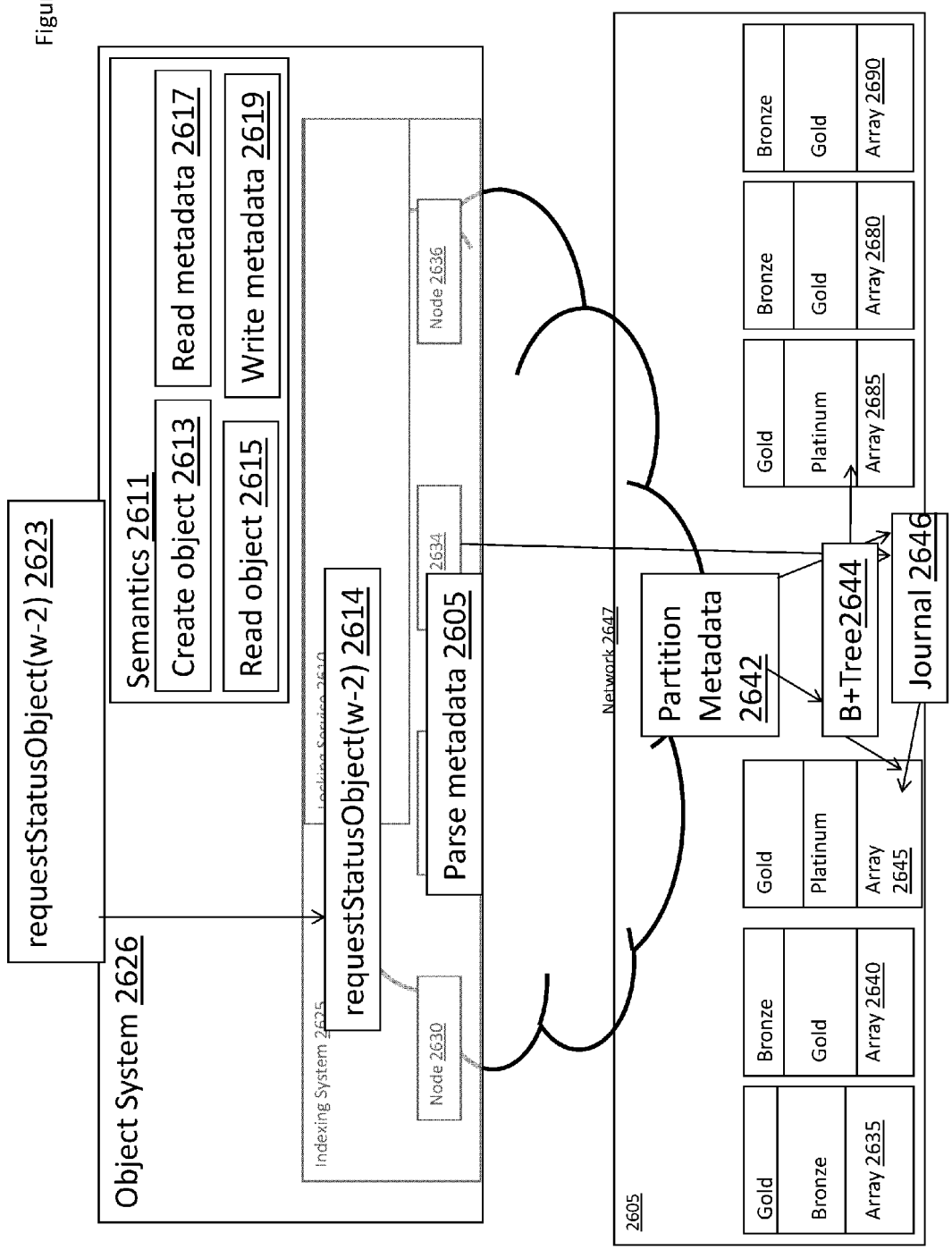
Figure 27:
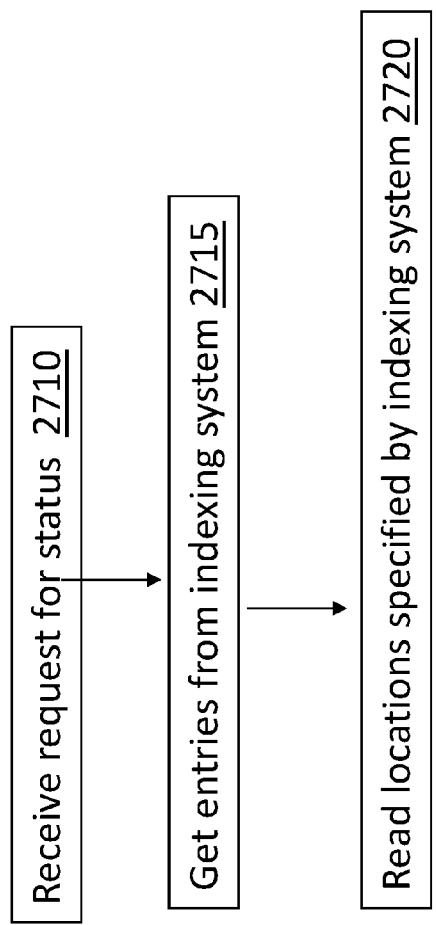
FIG. 27 is a simplified example of a method for requesting a status of an object in a bucket in a data storage system, in accordance with an embodiment of the present disclosure.

Refer now to the example embodiments of FIGS. 26 and 27, which show responding to a status request for an object. Object system 2626 receives a request for status for object w-2 2623 (step 2710). Object system 2626 gets the locations in the indexing system that correspond to the object requested (step 2715). Node 2634 reads the entries from the indexing system to return the object status (step 2720).

Figure 28:
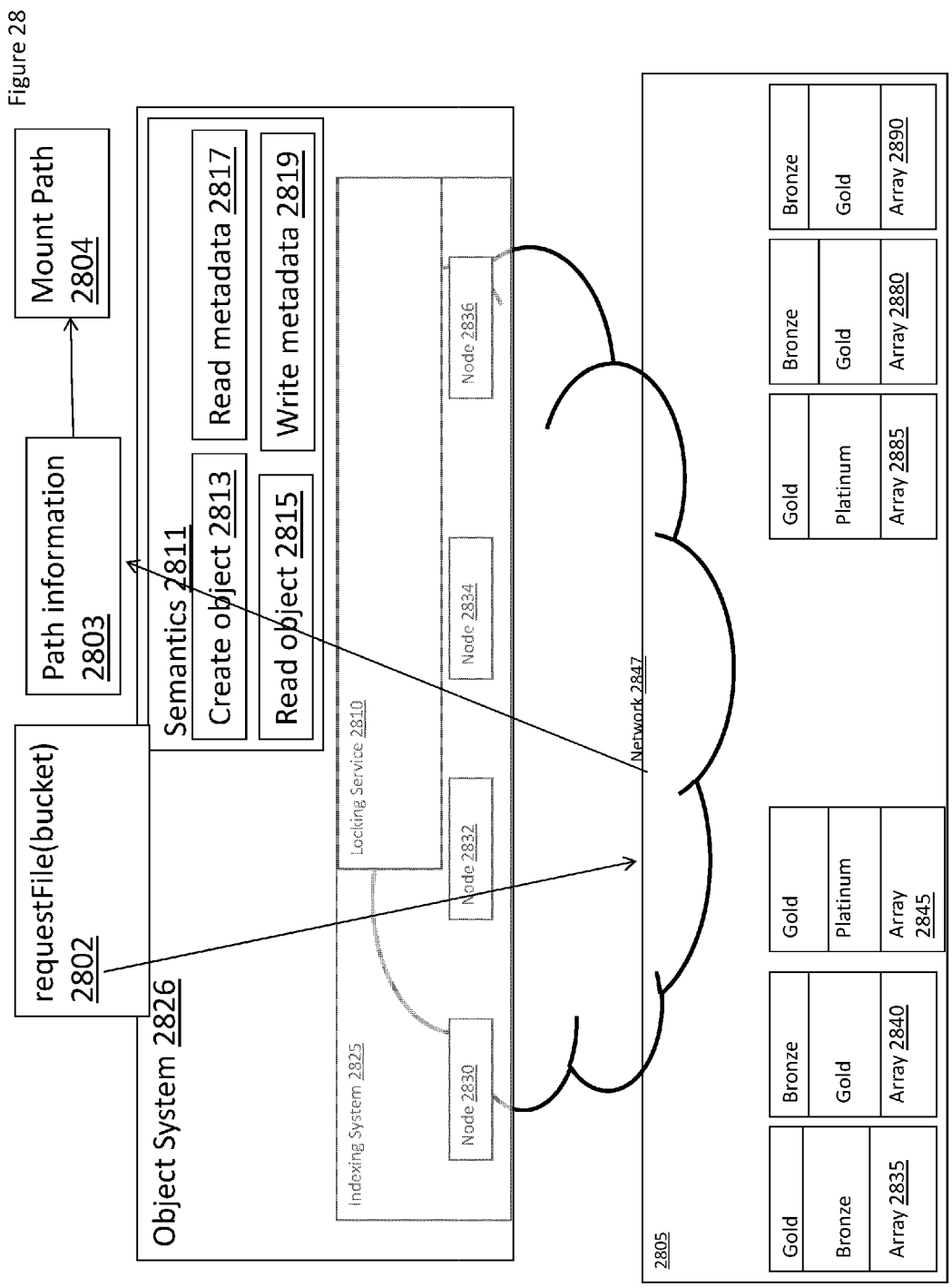
FIG. 28 is a simplified example of a method for requesting file system access in a data storage system, in accordance with an embodiment of the present disclosure.
Figure 29:
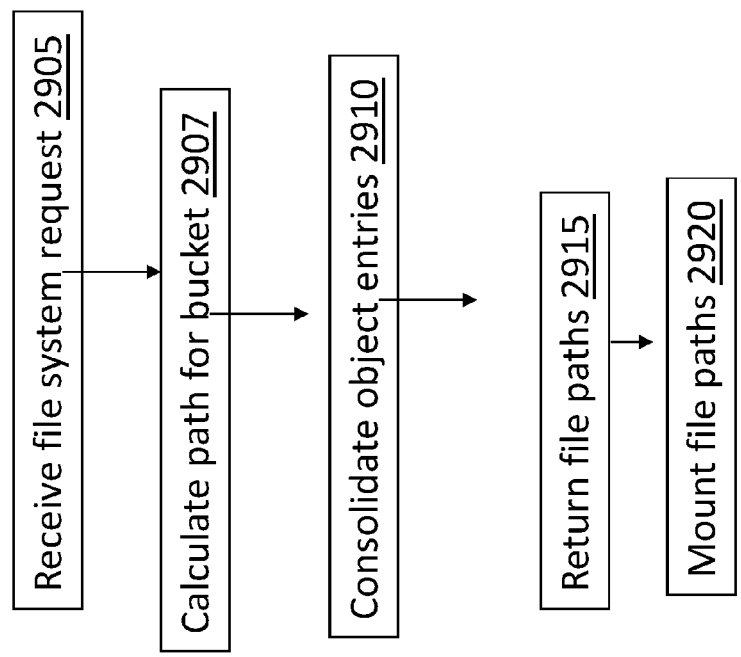
FIG. 29 is a simplified example of a method for requesting file system access from an object store in a data storage system, in accordance with an embodiment of the present disclosure.

Refer now to the example embodiments of FIGS. 28 and 29, which show file access to an object system. Object system 2826 receives a request for file system access (step 2905). The object system 2826 calculates the paths 2803 for the file system (step 2907). The object system 2826 determines consolidates the object entries (step 2810). The object system returns the file paths 2803 (step 2815). The file paths are mounted 2804 and read write access for the file system may be enabled (step 2920). In some embodiments, read write access to the file system may be enabled and access to the objects may not be permitted. In other embodiments, read access to both the file system and the object system may be enabled. In still further embodiments, read write access to the object system may be enabled and no access to the file system may be enabled.

In further embodiments, the data storage arrays may of the block type, file type, or object type. In some embodiments, the object system may span across block, file and object arrays. In other embodiments, the indexing system may span across file, block, and object arrays. In further embodiments, the object system may span across public accounts. In other embodiments the indexing system may span across public accounts. In some embodiments, the current disclosure may enable an object to be stored and received from a public cloud, such as Amazon's S3 or Microsoft's Adzure. In other embodiments, any type of array may be used and the current disclosure may enable coordination across the arrays regardless of type.

Figure 30:
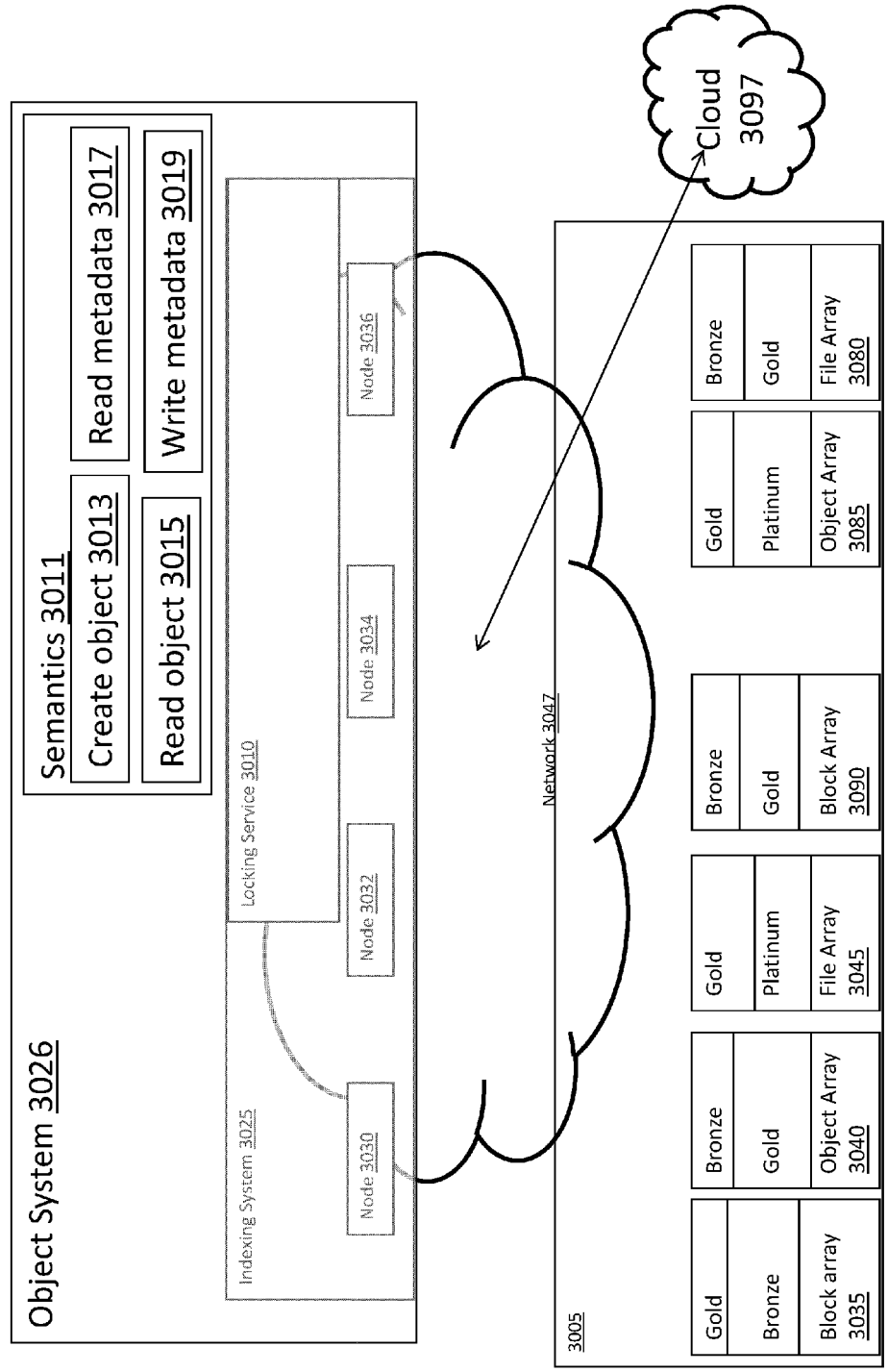
FIG. 30 is a simplified illustration of multiple array types overlaid with an object system in a data storage system, in accordance with an embodiment of the present disclosure.

For example, refer now to the example embodiment of FIG. 30, which illustrates different types of storage systems over laid with an object system. Object system 3026 communicates with cloud 2997 and site 3005 over network 3047. Cloud 2997 is a public cloud and information may be stored in and retrieved from the public cloud using object system 3026. Site 3005 has block arrays 3035 and 3090, object arrays 3040 and 3085, file arrays 3045 and 3080. Object 3026 system enables objects to be stored and retrieved any array and cloud 3097. As well, Object system 3026 also enables file access to objects stored in the arrays and cloud. In certain embodiments the cloud may be a private cloud. In other embodiments, the cloud may be a public cloud.

In further embodiments, an orchestration API may be part of a larger API or coordination API. In some embodiments, an orchestration API may request input from a large API or Orchestration engine. In other embodiments, an orchestration API may request input from a user. In still further embodiments, an orchestration API may be one of a set of other orchestration APIs, wherein each of the set of orchestration APIs offer different orchestration functionality. In of these embodiments, the set of orchestration APIs may be combined with an overall Orchestration or Engine layer which may coordinate requests between the set of orchestration APIs.

Figure 31:
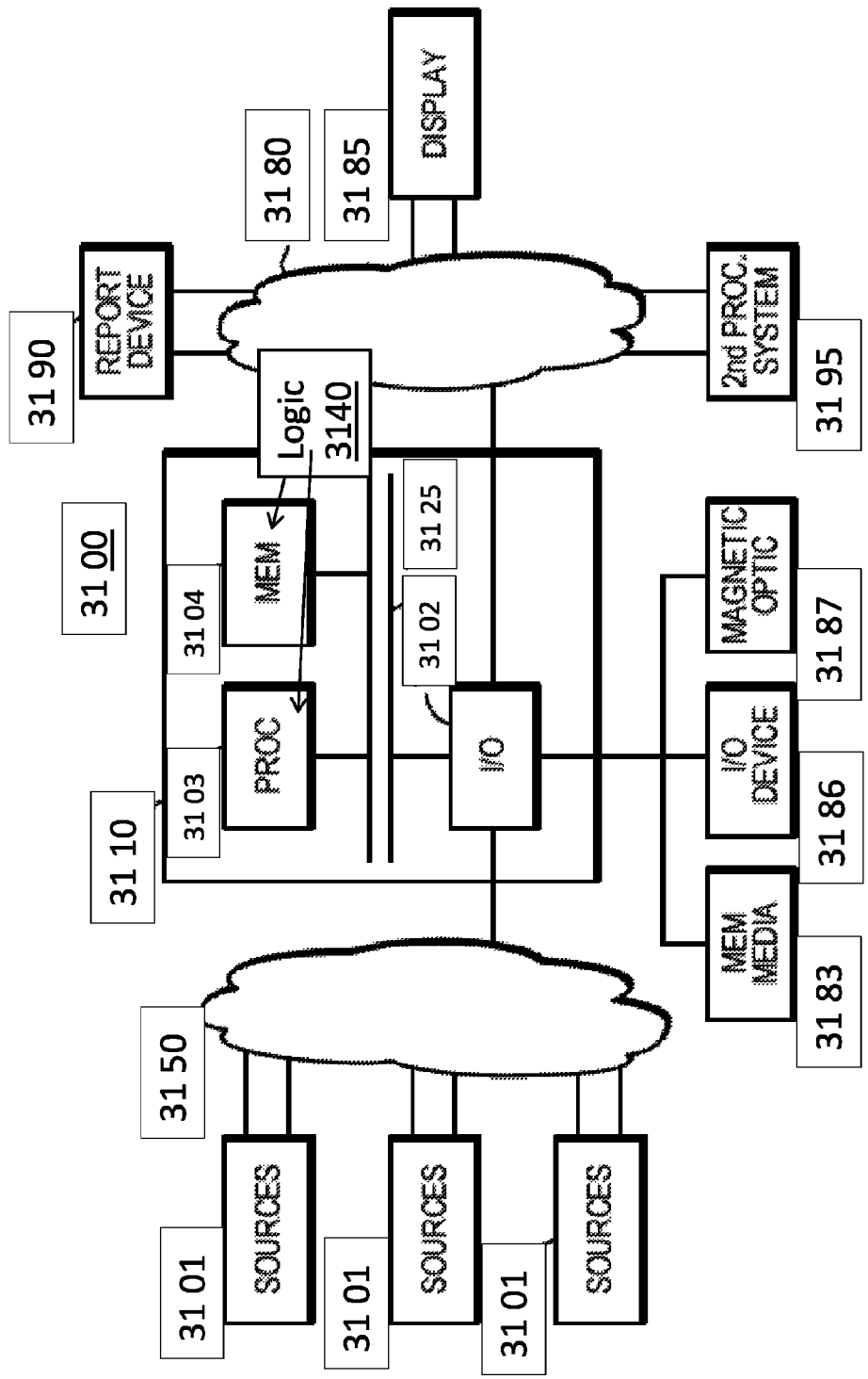
FIG. 31 is an example of an embodiment of an apparatus that may utilize the techniques described herein.
Figure 32:
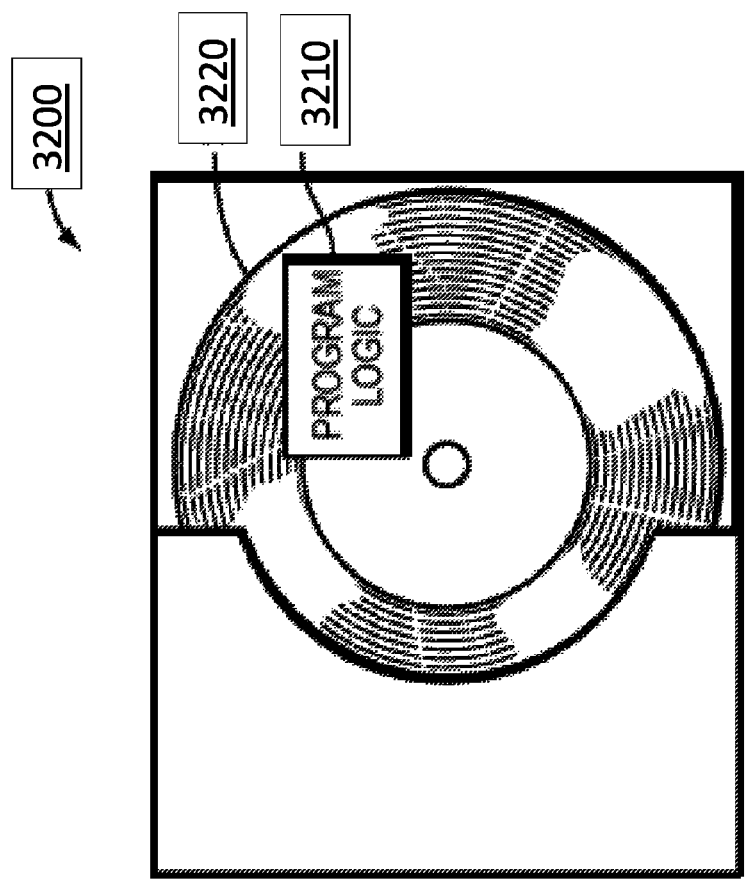
FIG. 32 is an example of an embodiment of a method embodied on a computer readable storage medium that may utilize the techniques described herein.

The methods and apparatus of this invention may take the form, at least partially, of program code (i.e., instructions)

embodied in tangible media, such as floppy diskettes, CD-ROMs, hard drives, random access or read only-memory, or any other machine-readable storage medium. When the program code is loaded into and executed by a machine, such as the computer of FIG. 31 the machine becomes an apparatus for practicing the invention. When implemented on one or more general-purpose processors, the program code combines with such a processor 3103 to provide a unique apparatus that operates analogously to specific logic circuits. As such a general purpose digital machine can be transformed into a special purpose digital machine. FIG. 32 shows Program Logic 3234 embodied on a computer-readable medium 3230 as shown, and wherein the Logic is encoded in computer-executable code configured for carrying out the reservation service process of this invention and thereby forming a Computer Program Product 3200. The logic 3234 may be the same logic 3140 on memory 3104 loaded on processor 3103. The program logic may also be embodied in software modules, as modules, or as hardware modules.

The logic for carrying out the method may be embodied as part of the system described below, which is useful for carrying out a method described with reference to embodiments shown in, for example, FIGS. 9, 14, and 16. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system for storage provisioning in a data storage environment, the system comprising:
 a storage provisioning engine; wherein the storage provisioning system includes an indexing system, a locking system, a database, and nodes; and
 computer-executable program code operating in memory coupled with a processor in communication with the database, wherein the computer-executable program code is configured to enable the processor to execute logic to enable:
 providing a scalable set of indexed key-value pairs enabled to store objects in a data storage environment; wherein the set of indexed key-value pairs are spread across the nodes; wherein the locking service enables each node of the nodes to coordinate with other nodes; wherein each of the nodes is connected to one or more file shares enabled to store objects in the data storage environment; wherein each file share is associated with a virtual pool; wherein the virtual pool is divided into partitions; wherein information about each partition is stored in the database; wherein objects associated with the key-value pairs are stored on the partitions; wherein the data representing the objects is enabled to be spread across arrays in the data storage environment; wherein additional arrays are enabled to be added to the data storage environment and included in the indexed key-value pairs; wherein the data stored across the arrays may be balanced.

2. The system of claim 1 wherein the storage provisioning engine is enabled to append data to an object in the indexed key-pair values by automatically appending the data to the end of the object stored in the data storage environment without having to specify additional information about the object.

3. The system of claim 1 wherein the balancing is based on class of service of the object.

4. The system of claim 1 wherein the balancing is based on quality of service of the object.

5. The system of claim 1 wherein a common namespace is overlayed on the key-value pairs.

6. A computer implemented method comprising:
 providing, via a provisioning engine including an indexing system, a locking system, a database, and nodes, a scalable set of indexed key-value pairs enabled to store objects in a data storage environment; wherein the set of indexed key-value pairs are spread across the nodes; wherein the locking service enables each node of the nodes to coordinate with other nodes; wherein each of the nodes is connected to one or more file shares enabled to store objects in the data storage environment; wherein each file share is associated with a virtual pool; wherein the virtual pool is divided into partitions; wherein information about each partition is stored in the database; wherein objects associated with the key-value pairs are stored on the partitions; wherein the data representing the objects is enabled to be spread across arrays in the data storage environment; wherein additional arrays are enabled to be added to the data storage environment and included in the indexed key-value pairs; wherein the data stored across the arrays may be balanced.

7. The method of claim 6 wherein the storage provisioning engine is enabled to append data to an object in the indexed key-pair values by automatically appending the data to the end of the object stored in the data storage environment without having to specify additional information about the object.

8. The method of claim 6 wherein the balancing is based on class of service of the object.

9. The method of claim 6 wherein the balancing is based on quality of service of the object.

10. The method of claim 6 wherein a common namespace is overlayed on the key-value pairs.

11. A computer program product comprising:
 a non-transitory computer readable medium encoded with computer executable program, the code enabling:
 providing, via a provisioning engine including an indexing system, a locking system, a database, and nodes, a scalable set of indexed key-value pairs enabled to store objects in a data storage environment; wherein the set of indexed key-value pairs are spread across the nodes; wherein the locking service enables each node of the nodes to coordinate with other nodes; wherein each of the nodes is connected to one or more file shares enabled to store objects in the data storage environment; wherein each file share is associated with a virtual pool; wherein the virtual pool is divided into partitions; wherein information about each partition is stored in the database; wherein objects associated with the key-value pairs are stored on the partitions; wherein the data representing the objects is enabled to be spread across arrays in the data storage environment; wherein additional arrays are enabled to be added to the data storage environment and included in the indexed key-value pairs; wherein the data stored across the arrays may be balanced.

12. The computer program product of claim 11 wherein the storage provisioning engine is enabled to append data to an object in the indexed key-pair values by automatically appending the data to the end of the object stored in the data storage environment without having to specify additional information about the object.

13. The computer program product of claim 11 wherein the balancing is based on class of service of the object.

14. The computer program product of claim 11 wherein the balancing is based on quality of service of the object.

15. The computer program product of claim 11 wherein a common namespace is overlayed on the key-value pairs.

16. The method of claim 6 further comprising:
determining at the indexing system a responsible node of the nodes to handle requests for an object;
routing a request from the indexing system to responsible node;
determining at the responsible node an array of the arrays;
routing the request from the responsible node to the array of the arrays.

17. The method of claim 6 wherein writes to an object are stored in a journal.

18. The method of claim 6 wherein a file system is layered over the scalable set of indexed key-value pairs to provide file access to the objects of the objects of the scalable set of indexed key-value pairs.

19. The method of claim 7 wherein the current state of an object is given by the object and any writes appended to the object.

* * * * *